(12) United States Patent
Guo et al.

(10) Patent No.: US 10,826,286 B2
(45) Date of Patent: Nov. 3, 2020

(54) BATTERY BOOST APPARATUS

(71) Applicants: SHEN ZHEN JQB INDUSTRIAL CO., LTD, Shenzhen (CN); JUST QUALITY BATTERY INDUSTRIAL CO., LTD, Hong Kong (CN)

(72) Inventors: Weilong Guo, Shenzhen (CN); Huihong Tang, Shenzhen (CN); Waihon Cheung, Hong Kong (CN); Mingchung Mui, Hong Kong (CN)

(73) Assignees: SHEN ZHEN JQB INDUSTRIAL CO., LTD., Shenzhen (CN); JUST QUALITY BATTERY INDUSTRIAL CO., LTD., Hong Kong (CN)

( * ) Notice: Subject to any disclaimer, the term of this patent is extended or adjusted under 35 U.S.C. 154(b) by 5 days.

(21) Appl. No.: 15/741,287

(22) PCT Filed: Jul. 4, 2016

(86) PCT No.: PCT/CN2016/088418
§ 371 (c)(1),
(2) Date: Jan. 1, 2018

(87) PCT Pub. No.: WO2017/005158
PCT Pub. Date: Jan. 12, 2017

(65) Prior Publication Data
US 2019/0081472 A1 Mar. 14, 2019

(30) Foreign Application Priority Data

| Jul. 5, 2015 | (CN) | 2015 2 0473477 U |
| Mar. 29, 2016 | (CN) | 2016 1 0187378 |
| Mar. 29, 2016 | (CN) | 2016 2 0250421 U |

(51) Int. Cl.
H02J 7/00 (2006.01)
H02H 7/18 (2006.01)
(Continued)

(52) U.S. Cl.
CPC .............. *H02H 7/18* (2013.01); *H02J 1/00* (2013.01); *H02J 7/0031* (2013.01);
(Continued)

(58) Field of Classification Search
CPC ...................................................... H02J 7/00
(Continued)

(56) References Cited

U.S. PATENT DOCUMENTS 6,212,054 B1    4/2001  Chan
6,638,101 B1 *  10/2003 Botelho ............... H01R 11/24
                                                439/188
(Continued)

FOREIGN PATENT DOCUMENTS

CN          2803825 Y    8/2006
CN          203522157 U  4/2014
(Continued)

OTHER PUBLICATIONS

International Search Report in PCT/CN2016/088418 dated Sep. 8, 2016, 4 pages.
(Continued)

*Primary Examiner* — Robert Grant
(74) *Attorney, Agent, or Firm* — Metis IP LLC

(57) ABSTRACT

A device for jump starting a vehicle with a depleted vehicle battery includes a power supply, a detecting unit, a microcontroller unit (MCU), and two output ports. At least one of the at least one of the two output ports may include a clamp. The detecting unit may be configured to detect a signal indicative of an open/closed state of the clamp. The microcontroller unit (MCU) may be configured to cut off an electrical connection of the clamp with a power supply of a booster basing on the detected signal indicative of the closed state of the clamp.

20 Claims, 13 Drawing Sheets

(51) Int. Cl.
*H02J 1/00* (2006.01)
*H02H 11/00* (2006.01)
*H02J 1/10* (2006.01)

(52) U.S. Cl.
CPC .......... *H02J 7/0034* (2013.01); *H02H 11/002* (2013.01); *H02J 1/122* (2020.01)

(58) Field of Classification Search
USPC ........................................................ 320/105
See application file for complete search history.

(56) References Cited

U.S. PATENT DOCUMENTS

| | | | | |
|---|---|---|---|---|
| 9,007,015 B1* | 4/2015 | Nook | ................... | H02J 7/0054 320/105 |
| 2005/0035740 A1* | 2/2005 | Elder | ................... | B60L 3/0046 320/116 |
| 2009/0218988 A1* | 9/2009 | Richardson | ........... | H02J 7/0034 320/134 |
| 2014/0202487 A1* | 7/2014 | Fereyre | ................... | A45D 2/00 132/224 |

FOREIGN PATENT DOCUMENTS

| | | |
|---|---|---|
| CN | 203522242 U | 4/2014 |
| CN | 204095721 U | 1/2015 |
| CN | 204131171 U | 1/2015 |

OTHER PUBLICATIONS

Written Opinion in PCT/CN2016/088418 dated Sep. 8, 2016, 4 pages.

* cited by examiner

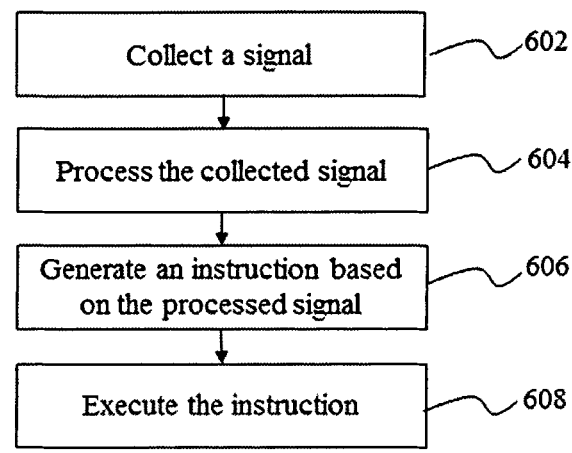
FIG. 6
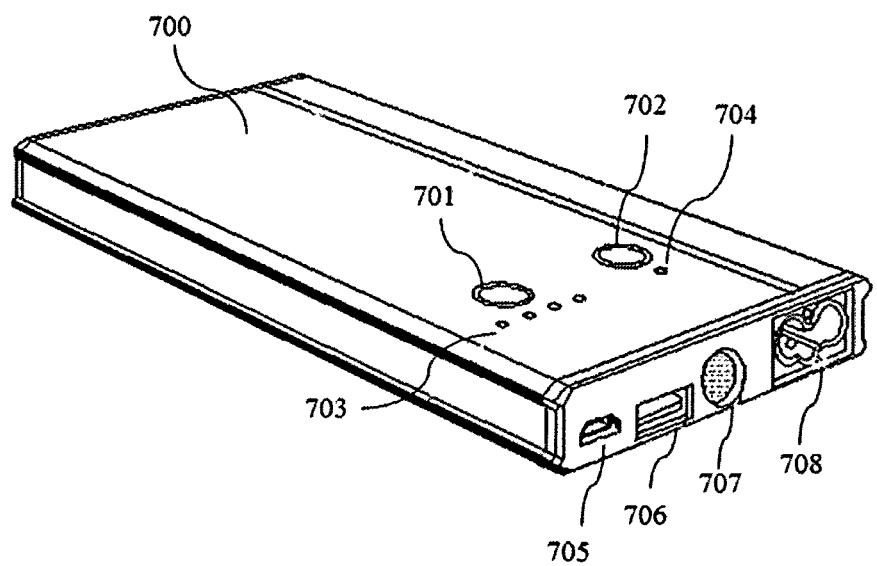
FIG. 7-A

FIG. 7-B

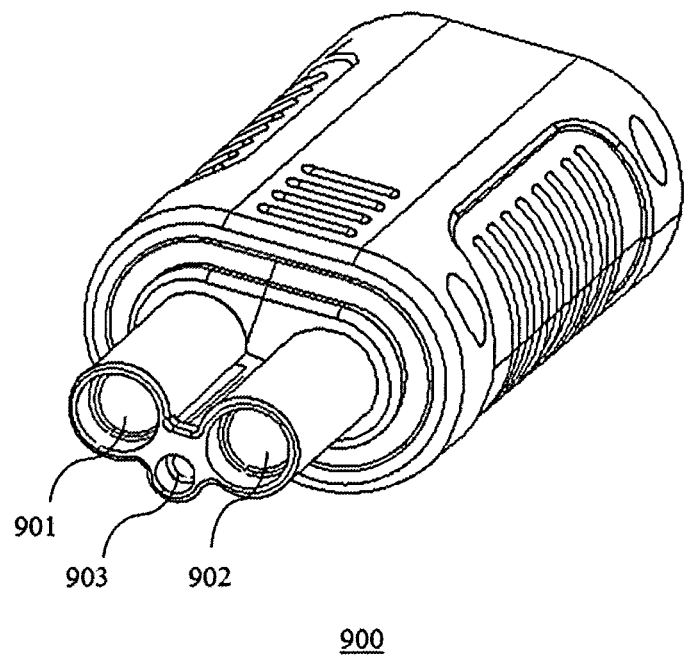
FIG. 9-A
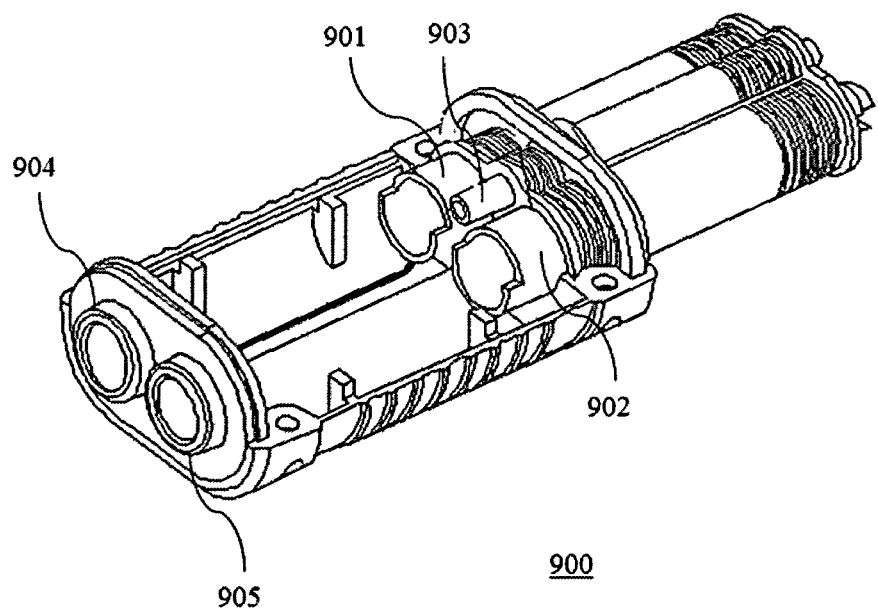
FIG. 9-B

BATTERY BOOST APPARATUS

TECHNICAL FIELD

This application is a U.S. national stage application of International Application No. PCT/CN2016/088418, filed on Jul. 4, 2016, which claims the priority of Chinese patent application No. 201520473477.1, filed on Jul. 5, 2015, and Chinese patent application No. 201610187378.6, filed on Mar. 29, 2016, and Chinese patent application No. 201620250421.4, filed on Mar. 29, 2016. Each of the above-referenced applications is expressly incorporated herein in their entireties.

BACKGROUND

Vehicle batteries are typically depleted when some vehicle loads are left to draw power from the battery without the motor turning the alternator. Typically, a booster with a power supply may be used to jump start the vehicle on which the depleted vehicle battery is implemented, by providing power to the depleted vehicle battery or the motor. Generally, a jumper cable device may be used to connect the booster to the vehicle battery, with its two ends being connected to the terminals of the vehicle battery and the power supply of the booster, respectively. The jumper cable device may be connected to the terminals of the vehicle battery through its attaching apparatuses (e.g., clamps). However, the attaching apparatuses of the jumper cable device may be inadvertently brought into contact with each other, thereby causing a short circuit resulting in sparking and potential damage to the booster.

SUMMARY

Some embodiments of the present disclosure relates to a system comprising a booster, a vehicle battery, and a jumper cable device for connecting the booster to the vehicle battery. The booster may include a power supply, a microcontroller unit (MCU), and a circuit. The jumper cable device may include a connecting means, a plurality of output ports. The plurality of output ports may include a positive output port, and a negative output port. In some embodiments, at least one of the output ports may include a cable and an attaching apparatus. The positive output port may include a positive cable and an attaching apparatus, and the negative output port may include a negative cable and an attaching apparatus. In some embodiments, the positive cable and the negative cable attach the attaching apparatuses to the power supply of the booster. The attaching apparatus may be a clamp, or a plug, or the like. In some embodiments, at least one attaching apparatus, such as, the attaching apparatus of the positive output port or the attaching apparatus of the positive output port, may be a clamp. The clamp may include an upper clamp halve and a lower clamp halve. In some embodiments, the upper clamp halve and the lower clamp halve may be connected to a detecting unit and a positive cable or negative cable, respectively. The detecting unit may be configured to detect a signal related to the open or closed state of the clamp at which it is located. In some embodiments, the detecting unit may include an electrical cable. The electrical cable may be located as to identify the open/closed state of the clamp. In some embodiments, the electrical cable may be connected with one clamp halve, while the other clamp halve of the clamp may be connected with the negative cable or the positive cable. Further, the detected signal may be transmitted to the MCU, based on which the MCU may generate an instruction related to the operation of the power supply or the circuit booster. In some embodiment, the instruction may be cutting off the electrical connection of the clamp with the power supply of the booster.

Some embodiments of the present disclosure related to a method for protecting a booster. The method may include one or more of the following operations. A signal related to an open or closed state of the clamp may be detected. The signal may be transmitted to a microcontroller unit for further processing. Further, an instruction may be generated based on the processed signal. In some embodiments, the signal may relate to an operation of a power supply of the booster, or a circuit (e.g., an overcurrent protecting circuit) in the booster. In some embodiments, the instruction may be cutting off the power supply of the booster or the circuit. In some embodiments, the instruction may be cutting off the circuit (e.g., an overcurrent protecting circuit) in the booster.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is an exemplary flowchart of a process for protecting the booster according to some embodiments of the present disclosure;

FIG. 7-B illustrates an interior structure of an exemplary booster according to some embodiments of the present disclosure;

FIG. 9-A illustrates a perspective view of an exemplary connecting means according to some embodiments of the present disclosure;

FIG. 9-B illustrates an interior structure of an exemplary connecting means according to some embodiments of the present disclosure;

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

It will be understood that when a unit, engine, module or block is referred to as being "on," "connected to" or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
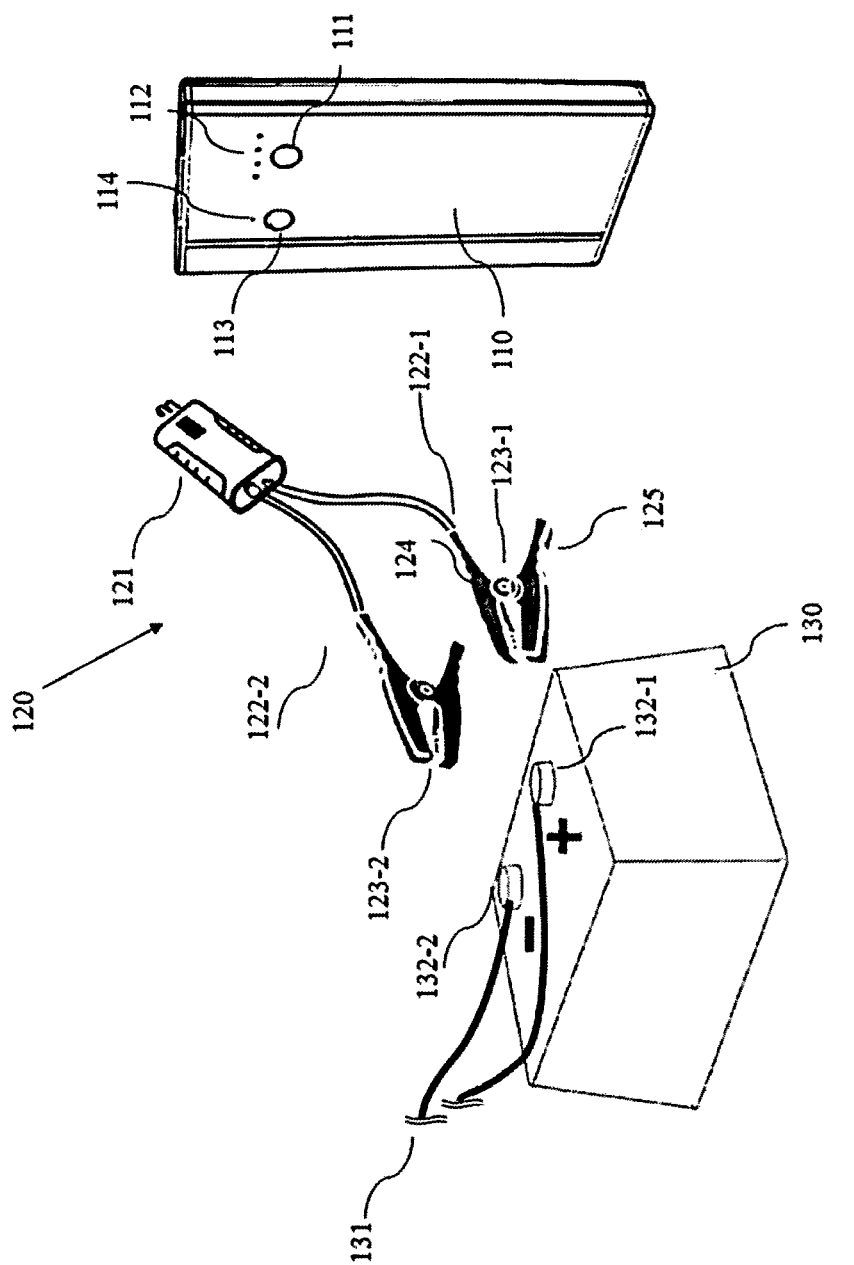
FIG. 1 is an exemplary boosting system according to some embodiments of the present disclosure.

FIG. 1 is an exemplary boosting system according to some embodiments of the present disclosure. As illustrated in FIG. 1, the boosting system 100 may include a booster 110, a jumper cable device 120, and a vehicle battery 130. In some embodiments, the vehicle battery 130 may be operably connected to the booster 110 through the jumper cable device 120. The booster 110 may be configured to start a vehicle with a depleted or exhausted vehicle battery 130. In some embodiments, the booster 110 may automatically electrically disconnect from the vehicle battery 130, once the vehicle, on which the vehicle battery 130 is implemented on, is started.

The booster 110 may include a flashlight switch 111, a plurality of power indicators 112, a manual override switch 113, an alerting indicator 114, and other components (e.g., an auxiliary circuit (not shown)). The flashlight switch 111 may be configured to provide a source of light to a user. In some embodiments, the flashlight switch 111 may be configured as a light source in dark. In some embodiments, the flashlight switch 111 may send out a SOS signal in an emergency situation. Merely by way of example, the flashlight switch may be a strobe flashlight.

The plurality of power indicators 112 may be configured to display remaining capacity status of power supply of the booster 110. In some embodiments, the plurality of battery may comprise a plurality of light-emitting diodes (LEDs). In some embodiments, the LEDs may provide light of different color, indicating the remaining power level of the booster 110. Merely by way of example, the LEDs may provide green light when the remaining power level of the booster is above 80%, while the LEDs may provide red light when the remaining power level of the booster 110 is below 30%.

The manual override switch 113 may activate a manual override mode in which the user may enable power to be delivered from the power supply of the booster 100 to the output port(s) 122.

The alerting indicator 114 may be configured to warn the user when a fault situation is detected. In some embodiments, the fault situation may be related to the operation status of the booster 110, for example, the operation temperature of the power supply of the booster 110, the magnitude of the current or voltage of the power supply of the booster 110, etc. More specifically, the fault situation may be the occurrence of an operation temperature of the power supply of the booster 110 that is greater (or lower) than a threshold temperature, an over/under voltage or over/under current of the power supply of the booster 110, etc. Further, in some embodiments, the fault situation may be an improper polarity connection between the booster 110 and the vehicle battery 130.

In some embodiments, the booster 110 may also include a wireless communication assembly (not shown). The wireless communication assembly may operate as a radio frequency (RF) communication device, a sub-sonic or ultrasonic device, an infrared communication device, and/or an optical or laser-type communication device, or any combination thereof. In some embodiments, the wireless communication assembly may be operable in a wireless network, for example, a WLAN network, a NFC network, a ZigBee network, a Z-wave network, an infrared communication network, a network provided by one or more mobile network operators, or the like, or any combination thereof. Further, in some embodiments, the wireless communication assembly may be disposed inside the housing of the booster 110.

The jumper cable device 120 may include a connecting means 121 and a plurality of output ports 122. The connecting means 121 may include an electrically insulated housing and a circuit (not shown). The plurality of output ports may include a positive output port 122-1, and negative output port 122-2.

In some embodiments, at least one of the output ports 122 may include a cable and an attaching apparatus 123. The positive output port 122-1 may include a positive cable and an attaching apparatus 123-1, and the negative output port may include a negative cable and an attaching apparatus 123-2. In some embodiments, the positive cable and the negative cable may connect the attaching apparatuses 123 to the power supply of the booster 110 electrically. The attaching apparatus may be a clamp, or a plug, or the like. In some embodiments, at least one attaching apparatus, such as, the attaching apparatus 123-1 of the positive output port 122-1, may be a clamp. As another example, the attaching apparatus 123-2 of the negative output port 122-2 may be a clamp. The clamp 123-1 may include an upper clamp halve 124 and a lower clamp halve 125. In some embodiments, the upper clamp halve 124 and the lower clamp halve 125 may be connected to a detecting component (not shown) and a positive cable (or negative cable), respectively. The detecting component may be configured to detect a signal related to the open or closed state of the clamp at which it is located. In some embodiments, the detecting component may include an electrical cable. Merely by way of example, the positive cable may be connected with the upper halve 124 of the clamp 123-1, and the detecting component may be connected to the lower halve 125 of the clamp 123-1. When the clamp 123 is in a closed state, in which the upper clamp halve 124 and the lower clamp halve 125 of the clamp 123-1 are in contact with each other, the detecting component may detect a signal indicating the closed state of the clamp 123. Likewise, when the clamp 123 is in an open state, the two clamp halves are not in contact with each other, and the detecting component may detect a signal indicating the closed state.

Figure 2:
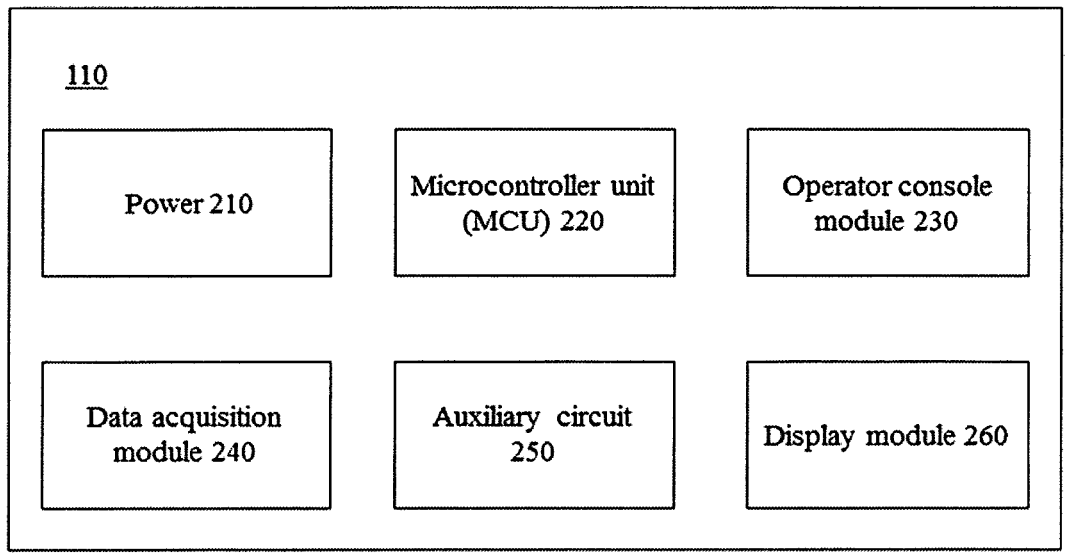
FIG. 2 is an exemplary block diagram of the booster according to some embodiments of the present disclosure.

In some embodiments, the signal detected by the detecting component may be transmitted to a microcontroller unit (MCU) 220 (illustrated in FIG. 2). In some embodiments, the MCU 220 may generate one or more instructions relating to the operation of the booster 110 based on the signal. Merely by way of example, the MCU 220 may generate one or more instructions to cut off the power supply of the booster 110, basing on the signal indicating the closed state of the clamp 123. As another example, the MCU 220 may generate one or more instructions to cut off the electrical connection of the clamp with the power supply of the booster, basing on the signal indicating the closed state of the clamp 123.

The housing of the connecting means 121 may have bosses and slots to aid to align the positive cable, the negative cable, and the detecting component. In some embodiments, an indicator, for example, an LED indicator may be located on the housing. In some embodiments, the LED indicator may be configured to provide a visual indication of proper or improper polarity connection, or an open circuited or a short circuited battery condition. Merely by way of example, the indicator may indicate, for example, whether the booster 110 and the vehicle battery 130 are properly interconnected, or whether a short circuit or an open circuit is detected in the booster 110 or in the vehicle battery 130.

In some embodiments, a moveable component may be located on the housing of the jumper cable device 120. The movable component may be a bar, a dial, a button, a key, or the like, or a combination thereof. The movable component may be slidable, rotatable, clickable, or the like, or a combination thereof. Merely by way of example, the movable component may be a manual override switch 113.

The circuit of the connecting means 121 may include a manual override circuit, a polarity-sensitive circuit, a current limiting circuit, and/or a switching circuit, etc. The current limiting circuit may be configured to prevent a current exceeding a predetermined maximum charging current. The predetermined maximum charging current may be set in a range of 40 to 60 amps. The polarity-sensitive circuit may be configured to verify the correct polarity of the connection of the terminals of the booster 110 and the vehicle battery 130. The polarity-sensitive circuit may also be configured to disconnect the booster 110 and the vehicle battery 130 electrically if an incorrect polarity connection is detected.

In some embodiments, the indicator, the moveable component, and the circuits may work in cooperation to provide the user a convenient means to ensure safety. Merely by way of example, when a reverse polarity situation is detected by the polarity sensitive circuit, the LED indicator may send out a signal indicative of the detected situation. The user may prevent the current from flowing to the vehicle battery 130 by turning off, for example, an "off" switch located on the housing.

The vehicle battery 130 may comprise a positive terminal 132-1 and a negative terminal 132-2, configured to connect the vehicle battery 130 to the booster 110 through the jumper cable device 120. The positive terminal 132-1 and the negative terminal 132-2 may also be configured to connect the vehicle battery 130 to a vehicle load circuit 131. In some embodiments, the vehicle battery 130 may be a lead-acid battery.

It should be noted that the above description is for illustrative purpose only. For a person having ordinary skill in the art, based on the content and principle of the present application, the form and details of the system 100 may be modified or changed without departing from certain principles. For example, the manual override switch 113 may be replaced by one or more slide bar, knob, dial, or the like, or a combination thereof. Correspondingly, the user may slide the slide bar, or rotate the knob or dial to provide information. Such modification or changes are still within the scope of the present application as defined by the claim.

FIG. 2 illustrated an exemplary block diagram of the booster 110 according to some embodiments of the present disclosure. As illustrated in FIG. 2, the booster 110 may include a power 210, a Microcontroller unit (MCU) 220, an operator console module 230, a data acquisition module 240, an auxiliary circuit 250, and a display module 260.

The power 210 may be configured to provide power to the booster 110, the vehicle battery 130, and the vehicle load circuit 131. Merely by way of example, the power 210 may provide power to the MCU 220, the operator console module 230, the data acquisition module 240, the auxiliary circuit 250, and the display module 260. In some embodiments, the power 210 may include a DC power supply, such as, a lithium battery, a button cell, etc. In some embodiments, the power 210 may be a rechargeable lithium ion battery pack.

The MCU 220 may be coupled with the operator console module 230, the data acquisition module 240, the auxiliary circuit 250, the power 210, and/or the display module 260, or any combination thereof. In some embodiments, the MCU 220 may receive information from the data acquisition module 240, the auxiliary circuit 250, and/or the operator console module 230. Further, the MCU 220 may control the operation of the operator console module 230, the data acquisition module 240, the auxiliary circuit 250, the power 210, and/or the display module 260, based on the received information.

Merely by way of example, the MCU 220 may generate one or more instructions to prevent the power 210 from charging or discharging, basing on the signal indicating that the temperature of the power 210 is greater or less than a threshold value. In some embodiments, the threshold value may be predetermined by the user through, for example, the operator console module 230. In some embodiments, the threshold value may be predetermined by the MCU 220. In some embodiments, the threshold value may be 60 degrees centigrade. When the temperature of the power 210 reaches or is higher than 60 degrees centigrade, the MCU may prevent the power 210 from charging or discharging. In some embodiments, the threshold value may be minus 5 degrees centigrade. When the temperature of the power 210 equals to or is lower than minus 5 degrees centigrade, the MCU may prevent the power 210 from charging or discharging.

Further, in some embodiments, the MCU 220 may receive information from an external device, such as an external medium or an external detecting component. The external medium may be any type of CD-ROM, DVD, floppy disk, hard disk, optical disk, flash RAM drive, or other type of computer-readable medium or a combination thereof. In some embodiments, the external detecting component may be located on the jumper cable device 120 (e.g., on the clamp 123 of the jumper cable device 120). The detecting component may detect a signal related to the open or closed state of the clamp 123 at which it is located, and transmit the detected signal to the MCU 220 for further processing. The MCU 220 may generate one or more instructions based on the detected signal for controlling the operation of the power 210. Merely by way of example, the instructions, when executed, may be configured to shut off the power 210 when the detected signal indicated that the clamp 123 is in a closed state.

The operator console module 230 may allow the user to interact with the MCU 220 and/or the display module 260. In some embodiments, the operator console module 230 may be configured to receive information (e.g., a command) from the user. The command may be an audio command, a video command, or an electrical signal. In some embodiments, the command may be transmitted to the MCU 220, and/or the display module 260.

In some embodiments, the operator console module 230 may include or communicate with a touch screen through which the user may control, interact with, and/or input commands to the operator console module 230 by, for example, touching a particular area of the operator console module 230. However, the operator console module 230 may take another form including, for example, a panel with a movable component, or the like, or a combination thereof. The movable component may be a bar, a dial, a button, a key, or the like, or a combination thereof. The movable component may be slidable, rotatable, clickable, or the like, or a combination thereof. Merely by way of example, the operator console module 230 may include a manual override switch 113, through which a manual override mode may be activated to enable the user to connect the power 210 to the vehicle battery terminals 132, when the MCU 220 is unable to determine the presence of a vehicle battery 130. As another example, the operator console module 230 may include a flashlight switch 111, through which the user may turn the flashlight on/off.

Further, in some embodiments, the operator console module 230 may be controlled by the user via a wired connection or a wireless connection. With respect to the wired control, a cable based network may be employed including, for example, an Ethernet connection, or a ring network connection, or the like, or any combination thereof. With regard to wireless control a wireless network may be employed including, for example, a WLAN network, a NFC network, a ZigBee network, a Z-wave network, an infrared communication network, a network provided by one or more mobile network operators, or the like, or any combination thereof. For instance, the user may control the operator console module 230 remotely with a cellphone, a tablet, a laptop, a remote control, or the like, or a combination thereof.

The data acquisition module 240 may detect or monitor one or more parameters relating to the operation status of the booster 110. The parameter(s) may include temperature, voltage, current, power, operation time span, or any combination thereof. In some embodiments, the voltage may be monitored to determine open circuit, disconnected conductive clamp(s) 123, shunt cable fault, and solenoid fault conditions, etc. The current through the shunt cable is monitored to determine whether there is a battery explosion risk. For example, excessive current may suggest overheating conditions, which may result in fire.

In some embodiments, the data acquisition module 240 may include a plurality of circuits, for example, a voltage detecting circuit, a short circuit detecting circuit, etc., to detect or monitor one or more parameters. In some embodiments, the detecting circuits may be in the form of a plurality of sensors, for example, a temperature sensor, a current sensor, a voltage sensor, a mechanical vibration sensor, and/or an audio sensor. The temperature sensor may collect a temperature-related signal, for example, the temperature of the power 210, the temperature of the MCU 220, and/or the temperature of the housing of the connecting means 121, etc. The audio sensor may collect an audio signal including, for example, noise, sound (e.g., ambient sound), human or animal voice, etc. The current sensor may collect a current signal, for example, the magnitude of the current flowing out from the power 210. Further, in some embodiments, the collected signal may be transmitted to the MCU 220 for further processing.

The auxiliary circuit 250 may work in coordinate with the MCU 220 to perform one or more functions. In some embodiments, the function may include detecting a fault situation in the circuit, protecting the circuit, sending out alerts to the user, etc. In some embodiments, the function may be an automatic connecting function. Merely by way of example, the auxiliary circuit 250 may include a USB charging circuit, a USB discharging circuit, a reverse protecting circuit, an overcurrent protecting circuit, an over-voltage/under voltage protecting circuit, and/or an automatic connecting circuit. For example, the USB charging circuit may be configured to convert power from any USB charger power source, to charge voltage and current for the power 210.

In some embodiments, the auxiliary circuit 250 may work in coordinate with the MCU 220. Merely by way of example, the auxiliary circuit 250 may detect a signal indicating a fault situation in the circuit, and transmit the detected signal to the MCU 220. The MCU 220 may send out one or more instructions to the auxiliary circuit 250 to remedy the fault situation. For example, the reverse protecting circuit may detect a signal indicating that the negative polarity (or positive polarity) of the booster 110 is not properly connected with the negative terminal 132-2 (or positive terminal 132-1) of the vehicle battery 130. Further, in some embodiments, the detected signal may be transmitted to the MCU 220, based on which one or more instructions to disconnect the booster 110 from the vehicle battery 130 may be generated. As another example, the auxiliary circuit 250 may detect a signal indicating the proper connection of the booster 110 and the vehicle battery 130. The auxiliary circuit 250 may transmit the detected signal to the MCU 220. The MCU 220 may send out one or more instruction to connect the booster 110 with the vehicle battery 130 automatically. In some embodiments, the instruction(s) may be executed by an automatic connecting circuit. In some embodiments, the automatic connecting circuit may be configured to connect the vehicle battery 130 without any manual operation for the vehicle battery 130 from being disconnected to being connected with the booster 110.

The display module 260 may present information relating the status of the booster 110 to the user. In some embodiments, the information presented may relate to the operation status of the booster 110 (e.g., whether a fault situation exists). In some embodiments, the information presented may relate to the power level of the power 210. In some other embodiments, the display module 260 may present a message to the user notifying whether the command sent has been executed properly.

It should be noted that the above description is for illustrative purpose only. For a person having ordinary skill in the art, based on the content and principle of the present application, the form and details of the booster 110 may be modified or changed without departing from certain principles. For example, the operator console module 230 may be a touch screen, which may be used to display a signal to the user. Such modification or changes are still within the scope of the present application as defined by the claim.

Figure 3:
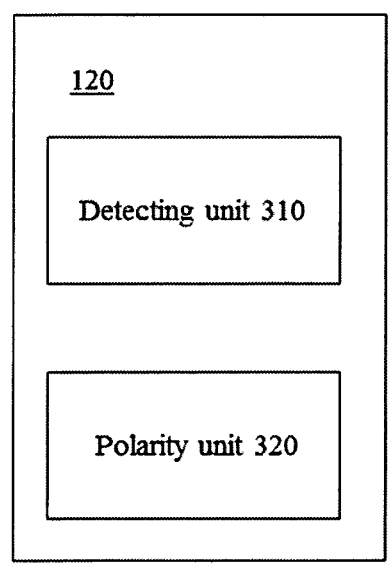
FIG. 3 is an exemplary block diagram of the jumper cable device according to some embodiments of the present disclosure.

FIG. 3 is an exemplary block diagram of the jumper cable device 120 according to some embodiments of the present disclosure. As illustrated in FIG. 3, the jumper cable device 120 may include a detecting unit 310 and a polarity unit 320. The detecting unit 310 may be configured to detect a signal related to an open/closed state of the clamp 123. In some embodiments, the detected signal may be transmitted to the MCU 220. The detecting unit 310 may include a sensor, for example, an electrical sensor, a distance sensor, etc. Merely by way of example, the electrical sensor may detect the current flowing through the negative cable or the positive cable. The electrical sensor may also determine an open or closed state of the clamp 123 based on the detected current. As another example, the distance sensor may detect a signal related to the distance between two clamp halves of the clamp 123 and determine an open or closed state of the clamp 123 based on the detected signal. In some embodiments, the sensor may be located on the clamp 123. In some other embodiments, the sensor may be located on the positive cable or the negative cable, or other attaching apparatuses rather than the clamp 123 for determining the open/closed state of the clamp 123. In some embodiments, the detecting unit 310 may be an electrical cable configured to determine the open/closed state of the clamp. In some embodiments, the electrical cable, which may be referred as the detecting cable, may be connected with one clamp halve 124, and the other clamp halve of the clamp 123 may be connected with the negative cable or the positive cable.

The polarity unit 320 may be configured to connect the vehicle battery 130 to the booster 110. In some embodiments, the polarity unit 320 may be configured to provide power, or current, or voltage, from the booster 110 to the vehicle battery 130. The polarity may include a positive cable and a negative cable. In some embodiments, at least one of the positive cable and the negative cable may be in connection with the detecting unit 310 operably. Merely by way of example, the positive cable and the detecting unit 310 may be connected with two halves of the clamp 123, respectively. The positive cable and the detecting unit 310 may be in contact when the clamp 123 is in a closed state, in which the two clamp halves may be in contact with each other. On the other hand, when the clamp 123 is in an open state, in which its two clamp halves may not be in contact with each other, the positive cable and the detecting unit 310 may not be in contact.

It should be noted that the above description is for illustrative purpose only. For a person having ordinary skill in the art, based on the content and principle of the present application, the form and details of the jumper cable device 120 may be modified or changed without departing from certain principles. For example, the polarity unit 320 may also include a ground cable and a positive cable, being designed to achieve an electrical connection between the power 210 and the vehicle battery 130. Such modification or changes are still within the scope of the present application as defined by the claim.

Figure 4:
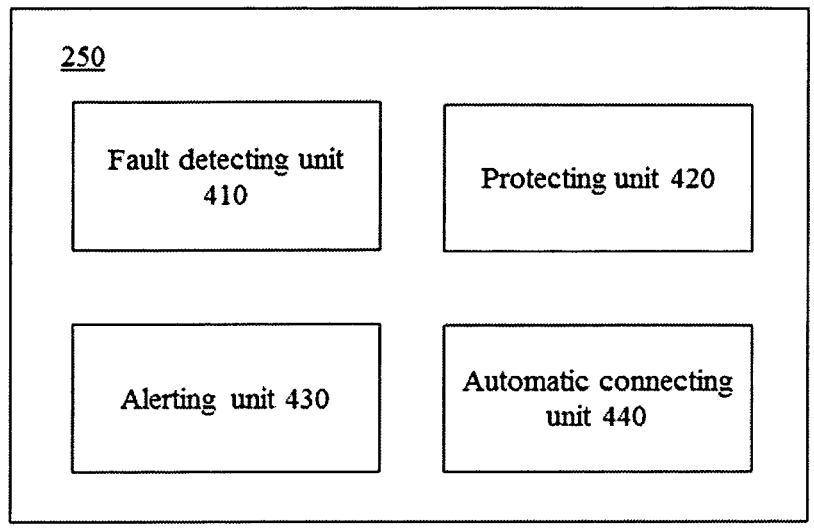
FIG. 4 is an exemplary block diagram of the auxiliary circuit according to some embodiments of the present disclosure.

FIG. 4 is an exemplary block diagram of the auxiliary circuit 250 according to some embodiments of the present disclosure. As illustrated in FIG. 4, the auxiliary circuit 250 may include a fault detecting unit 410, a protecting unit 420, an alerting unit 430, and an automatic connecting unit 440. The fault detecting unit 410 may be configured to detect a fault situation in the system 100. In some embodiments, the fault situation may be related to the operation status of the booster 110, for example, the operation temperature of the power 210, the magnitude of the current or voltage of the power 210, etc. More specifically, the fault situation may be the occurrence of an operation temperature of the power 210 that is greater (or lower) than a threshold temperature, an over/under voltage or over/under current of the power 210, etc. Further, in some embodiments, the fault situation may be an improper polarity connection between the booster 110 and the vehicle battery 130. Merely by way of example, the fault detecting unit 410 may include a temperature sensor, a voltage detecting sensor, and/or a reverse polarity sensor, etc. The reverse polarity sensor may be configured to detect the polarity of a vehicle battery 130 connected between the positive and negative polarity outputs. In some embodiments, the reverse polarity sensor may be connected in circuit with the positive and negative polarity outputs.

The protecting unit 420 may be configured to protect the booster 110. In some embodiments, the protecting unit 420 may be connected with the fault detecting unit 410. More specifically, the protecting unit 420 may receive a signal, by which it may be activated, from the fault detecting unit 410. In some embodiments, the protecting unit 420 may include an overcurrent protecting circuit, an overvoltage protecting circuit, a low voltage protecting circuit, a reverse polarity protecting circuit, and/or a temperature protecting circuit.

The reverse polarity protecting circuit may prevent the power from being connected to the vehicle battery 130 when the terminals 132 of the vehicle battery 130 are connected to the wrong attaching apparatuses 123 of the booster 110. The temperature protecting circuit may interrupt the charging or discharging of the power 210 when the temperature of the power 210 rises to a predetermined level. The low voltage protecting circuit may be configured to cut off the power 210 when the voltage thereof equals to or is lower than a threshold value. In some embodiments, the threshold value may range between 5.8 volts to 6.2 volts.

The alerting unit 430 may send out one or more alerts signal when a fault situation is detected. In some embodiments, the alerting unit 430 may be connected with the fault detecting unit 410 and the protecting unit 420. In some embodiments, the alerting unit 430 may receive information, for example, the fault situation signal from the fault detecting unit 410. In some embodiments, the alerting unit 430 may send out one or more alerts based on the received fault situation signal. Merely by way of example, when the voltage detecting circuit detects the voltage of the power 210 is lower than a threshold value (e.g., 6 volts), the alerting unit 430 may send out an alert. The alert(s) may be in form of text, light, audio, and/or video. The alerting unit 430 may be an indicator, for example, an alerting indicator 114, etc.

The automatic connecting unit 440 may automatically connect the vehicle battery 130 to the booster 110 electrically when no fault situation is detected. The fault situation may be related to the operation status of the booster 110, for example, the operation temperature of the power supply of the booster 110, the magnitude of the current or voltage of the power supply of the booster 110, the polarity connection between the vehicle battery 130 and the booster 110, or the like. Merely by way of example, the automatic connecting unit may automatically connect the vehicle battery 130 to the booster 110 electrically, when the vehicle battery 130 is connected between the positive output port 122-1 and the negative output port 122-2, and the positive and negative terminals 132 of the vehicle battery 130 are connected with the positive and negative output ports 122 properly, and may not automatically connect the vehicle battery 130 to the booster 110 electrically, when the vehicle battery 130 is connected between the positive output port 122-1 and the negative output port 122-2, and the positive and negative terminals 132 of the vehicle battery 130 are connected with the positive and negative output ports 122 improperly. In some embodiments, the automatic connecting circuit may be configured to connect the vehicle battery 130 electrically to the booster 110 automatically. Specifically, no manual operation is required for the vehicle battery 130 from being disconnected to the booster 110, to being connected to the booster 110.

It should be noted that the above description is for illustrative purpose only. For a person having ordinary skill in the art, based on the content and principle of the present application, the form and details of the jumper cable device 120 may be modified or changed without departing from certain principles. For example, the protection circuit may be able to detect a fault situation. For example, the overcurrent protecting circuit may be able to detect an overcurrent signal, and to cut off the power to protect the booster 110. Such modification or changes are still within the scope of the present application as defined by the claim.

Figure 5:
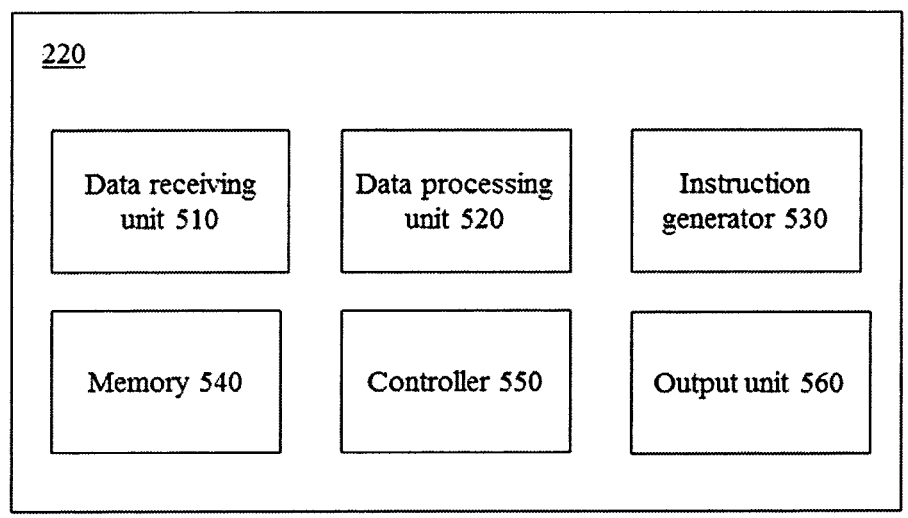
FIG. 5 is an exemplary block diagram of the MCU according to some embodiments of the present disclosure.

FIG. 5 is an exemplary block diagram of the MCU 220 according to some embodiments of the present disclosure. As illustrated in FIG. 5, the MCU 220 may include a data receiving unit 510, a data processing unit 520, an instruction generator 530, a memory 540, a controller 550, and an output unit 560. The data receiving unit 510 may be configured to receive data from the data acquisition module 240, the auxiliary circuit 250, the operator console module 230, or a combination thereof. The data received may include parameters like, temperature, voltage, current, power, operation time span, or any combination thereof. Also, the data may relate to a signal indicative of the closed or open state of the clamp 123 configured to connect one terminal 132 of the vehicle battery 130. In some embodiments, the signal may be detected by a detecting cable, which may be in connection with one clamp halve 125.

In some embodiments, the data receiving unit 510 may be connected with the data processing unit 520, the instruction generator 530, the memory 540, the controller 550, and/or the output unit 560. For example, in some embodiments, the data receiving unit 510 may transmit the received data to the memory 540, in which the received data may be stored. In some embodiments, the data receiving unit 510 may transmit the received data to the data processing unit 520. In some embodiments, the data receiving unit 510 may be controlled by the controller 550. Merely by way of example, the controller 550 may decide a certain portion of the received data that may be transmitted to the data processing unit 520.

The data processing unit 520 may be configured to process the received data. The data processing unit 520 may be connected with the data processing unit 520, the instruction generator 530, the memory 540, and/or the controller 550. In some embodiments, the data processing unit 520 may receive data from the data receiving unit 510. In some embodiments, the data processing unit 520 may process the received data and send the processed data to the instruction generator 530. In some embodiments, the processed data may be stored in the memory 540. In some embodiments, the data processing unit 520 may also request data from the memory 540. Merely by way of example, the data processing unit 520 may retrieve data relating to a signal indicative of the open or closed state of the clamp from the memory 540. In some embodiments, the signal to be retrieved may be detected previously.

The instruction generator 530 may generate one or more instructions relating to the operation of the booster 110. The instruction generator 530 may be connected with the data processing unit 520, the controller 550, the memory 540, and/or the output unit 560. In some embodiments, the instruction generator 530 may receive processed data from the data processing unit 520, based on which one or more instructions may be generated. Merely by way of example, the instruction(s), when executed, may cause the power 210 to be cut off from the electrical connection with other component(s) of the system 100, the overcurrent protecting circuit to be turned off, the startup protection circuit to be turned off, etc. In some embodiments, the generated instruction(s) may be transmitted to the output unit 560, through which the generated instructions may be transmitted to the display module 260.

The memory 540 may be configured to store data. In some embodiments, the data may be received from the data receiving unit 510, the data processing unit 520, the instruction generator 530, or the controller 550.

Merely by way of example, the memory 540 may store a plurality of instructions generated and/or sent by the instruction generator 530. As another example, the memory 540 may store an algorithm or protocol that may be utilized by the data processing unit 520. As another example, the memory 540 may store a set of signal related to the open or closed state of the clamp 123, in some embodiments, the signals may be transmitted by the data receiving unit 510 at different time point. In some embodiments, the memory 540 may be configured to delete the digital data being stored, when working in coordinate with the MCU 220. Merely by way of example, the memory 540 may delete the signals related to open or closed state of the clamp 123 collected in a certain time period, for example, two days ago.

The controller 550 may be configured to control the MCU 220. The controller 550 may be connected with the data receiving unit 510, the data processing unit 520, the instruction generator 530, the memory 540, and/or the output unit 560. In some embodiments, the controller 550 may be connected with the data processing unit 520. Merely by way of example, the controller 550 may determine the algorithm or protocol for the data processing unit 520.

The output unit 560 may transmit to and/or received from the instruction generator 530, the controller 550, the memory 540, the auxiliary circuit 250, and the display module 260 one or more instructions. The output unit 560 may be connected with the instruction generator 530. For example, the output unit 560 may receive the instruction generated by the instruction generator 530. In some embodiments, the output unit 560 may be connected with the display module 260. For example, the output unit 560 may send the instruction, for example, sending out an alert, to the display module 260. In some embodiment, the output unit 560 may send the instruction, for example, cutting off the power 210, or cutting off the overcurrent protecting circuit from an auxiliary circuit 250.

It should be noted that the above description is for illustrative purpose only. For a person having ordinary skill in the art, based on the content and principle of the present application, the form and details of the jumper cable device 120 may be modified or changed without departing from certain principles. For example, the memory 540 may be a storage located outside the system 100, or an own cloud, etc. Such modification or changes are still within the scope of the present application as defined by the claim.

FIG. 6 is an exemplary flowchart of a process for protecting the booster 110 according to some embodiments of the present disclosure. At 602, a signal may be collected. In some embodiments, the signal may be collected by the data acquisition module 240, the fault detecting unit 410, or the detecting unit 310, or a combination thereof. The signal may be related to one or more parameters like temperature, voltage, current, power, operation time span, or a combination thereof. In some embodiments, the signal may indicate a fault situation within the system 100. In some embodiments, the fault situation may be related to the operation status of the booster 110, for example, the operation temperature of the power 210, the magnitude of the current or voltage of the power 210, etc. More specifically, the fault situation may be the occurrence of an operation temperature of the power 210 that is greater (or lower) than a threshold temperature, an over/under voltage or over/under current of the power 210, etc. Further, in some embodiments, the fault situation may be related to a proper polarity connection between the booster 110 and the vehicle battery 130. In some embodiments, the signal may be related to the open or closed state of the clamp 123. Merely by way of example, the signal may indicate the closed state of the clamp 123.

At 604, the collected signal may be processed by the MCU 220. Merely by way of example, the MCU may decode and/or identify the signal indicating the open or closed state of the clamp 123. At 606, the MCU 220 may generate one or more instructions based on the processed signal. Merely by way of example, an instruction for, for example, cutting off the power 210, turning off the overcurrent protecting circuit, turning off the startup protection circuit, etc., may be generated by the MCU 220, based on the processed signal indicating a closed state of the clamp 123. Similarly, an instruction for, for example, turning on the power 210, turning on the overcurrent protecting circuit, turning on the startup protection circuit, etc., may be generated by the MCU 220, based on the processed signal indicating an open state of the clamp 123.

At 608, the generated instruction may be executed. In some embodiments, the instruction may be executed by the power 210 or the auxiliary circuit 250. Merely by way of example, the power 210, the overcurrent protecting circuit, and/or the startup protection circuit may be switched off, according to the generated instruction.

Figure 7:
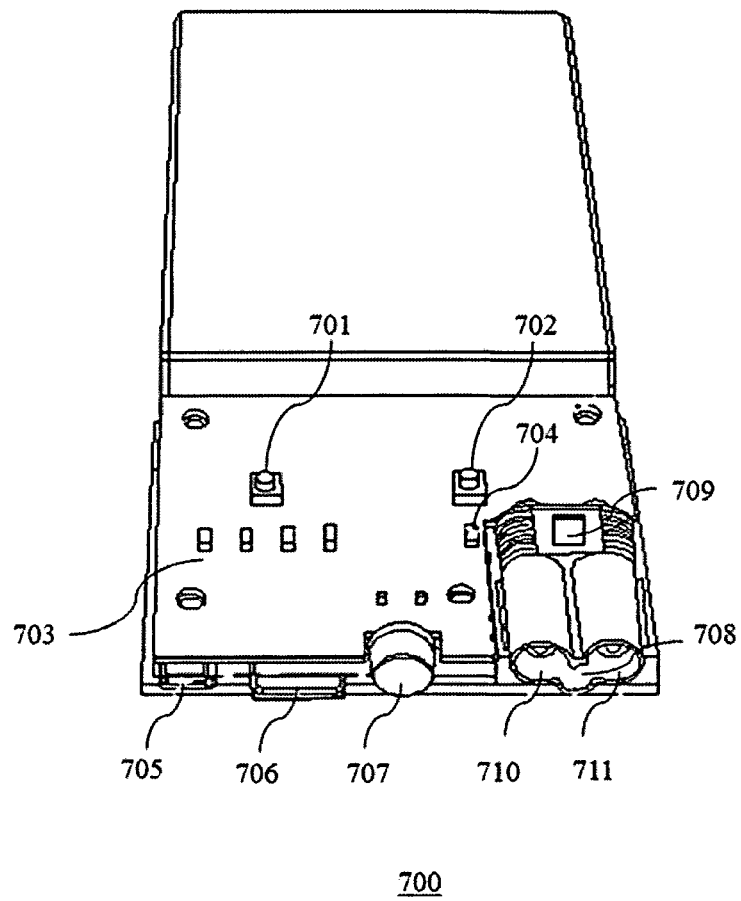
FIG. 7-A illustrates an exterior structure of an exemplary booster according to some embodiments of the present disclosure.

FIG. 7-A illustrates an exterior structure of an exemplary booster according to some embodiments of the present disclosure. As is shown in the figure, the booster 700 may include a flashlight switch 701, a manual override switch 702, a plurality power indicators 703, an alarming indicator 704, a charging port 705, a discharging port 706, a LED light 707 and a booster output port 708.

The flashlight switch 701 may control the switch of the LED light 707 between different modes. In some embodiments, the flashlight switch 701 may control an on-off state of the LED light 707 through an internal lighting circuit. In some embodiments, the flashlight switch 701 may also turn on the LED light 707, which may be configured to furnish a flashlight. In some embodiments, the LED light 707 may operate in different modes, including a constant flashlight mode, a flashing strobe light mode, and a SOS mode (which may be used to provide a SOS signal in emergency or in danger).

The manual override switch 702 may connect to a manual override circuit which is configured to activate a manual jump start of the vehicle. Power indicators 703 may connect to a power indicating circuit and display a remaining capacity status of the battery within the booster 110. The power indicators 703 may be implemented by LED display or LED lights and may indicate a charging state and a discharging state in different ways. In some embodiments, the LEDs may provide output light of different colors according to the remaining capacity of the battery. In some embodiments, there may be a plurality of LEDs located on the front panel, and the amount of the power indicators turned on represents a corresponding remaining power level while the battery is in a discharging state. For example, three of the four lights turned on may indicate a battery power level that is between 50% and 75%. In some embodiments, there may be one light blinking while charging the battery through the USB charging port 706.

The alarm indicator 704 may connect to an alarm circuit for providing a user notification of safety risks as well as other working conditions. In some embodiments, failure to recognize the correct polarity by connecting the colored clamps to the wrong poles may be detected by a reverse protecting circuit, and a notification may be presented to the users (e.g., by providing a strong and constant red light through the alarm indicator 704). In some embodiments, the alarm indicator 704 may be used to verify a voltage level of the battery within the booster, which should be within a predetermined range for a safe jump start. A weak but constant red flashlight may be activated when the battery voltage is below the lower limit of the predetermined voltage range. And a strobe red flashlight may indicate a voltage level higher than the upper limit. In addition, a constant green light may be turned on indicating the battery voltage level is within the predetermined range as well as an automatic identification for vehicle jump start.

The charging port 705 and the discharging port 706 may be configured to charge the battery of the booster 700 and providing power supply for peripherals. In some embodiments, the charging port and the discharging port may be in any form. For example, the charging port may be USB charging port. In some embodiments, the charging port and the discharging port may be omitted in the case of a wireless charging/discharging.

The booster output port 708 may be configured to supply power to the vehicle battery for vehicle jump start. In some embodiments, the booster output may also receive the signal related to the open or closed state of the clamp. In some embodiments, the booster output port may include three different connection ports, connected to the negative pole and positive pole of the vehicle battery, and the signal acquisition unit, respectively. In some embodiments, the booster output port 708 may be omitted, and through a pair of cables, the booster 700 may directly connect to the two clamps.

FIG. 7-B illustrates an interior structure of an exemplary booster according to some embodiments of the present disclosure. FIG. 7-B may illustrate the same elements as explained with reference to FIG. 7-A except that the booster output port 708 is shown in detail and may further include a signal reception port 709, a negative output port of the booster 710 and a positive output port of the booster 711. The signal reception port 709 may be configured to receive a signal related to the open and closed state of the clamp and transmit to the booster 700. In some embodiments, the signal is transmitted to the MCU through the signal reception port 709. In some embodiments, the signal reception port 709 may be a square jack and located above the negative output port 710 and the positive output port 711 on the side of the booster 700.

In some embodiments, the negative output port 710 may connect to the negative pole of the vehicle battery through the black clamp on the negative output cable, and the positive output 711 may connect to the positive pole of the vehicle battery through the red clamp on the positive output cable. The negative output port 710 and the positive output port 711 may be circular jack distinct from the signal reception port 709. In some embodiments, the signal reception port 709, the negative output port 710, and the positive output port 711 may connect to cables through a connecting means, which provides an arrangement of wires and will be disclosed in detail in FIG. 9.

Figure 8:
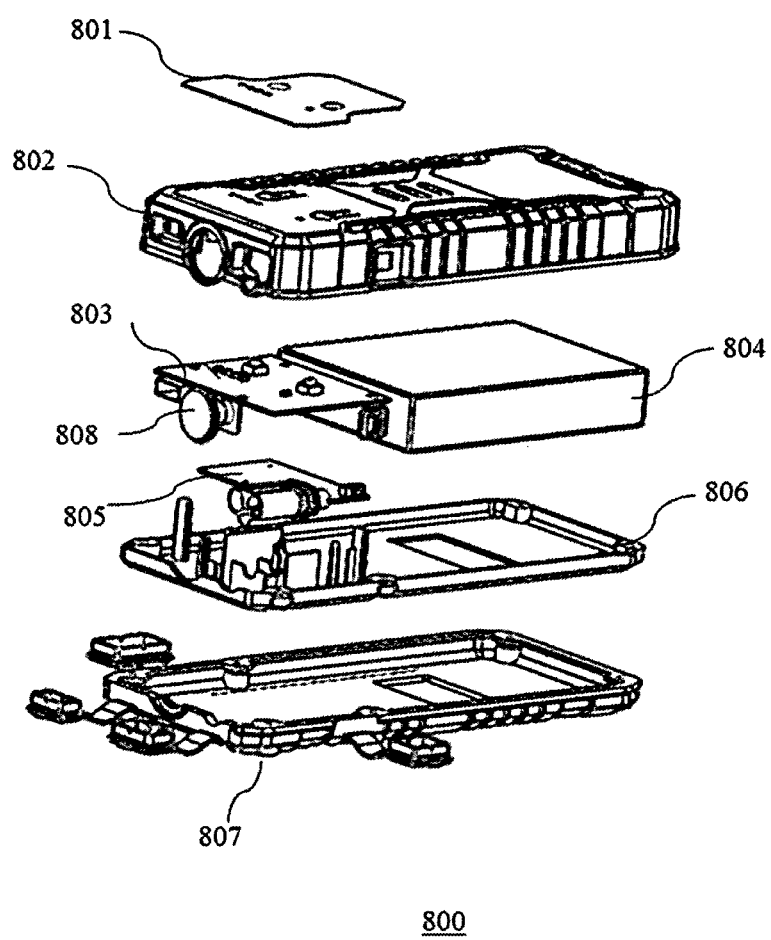
FIG. 8 illustrates an exploded view of an exemplary interior structure of the booster according to some embodiment of the present disclosure.

FIG. 8 illustrates an exploded view of an exemplary interior structure of the booster according to some embodiment of the present disclosure. The booster 800 may further include a label 801, a top shell 802, a mainboard 803, on which a plurality of electric circuits are integrated, a battery cell 804, a LED light 808, an overcurrent protection circuit board 805, an inner bottom shell 806, and an outer bottom shell 807. In some embodiments, the inner bottom shell 806 may be snap fitted above the outer bottom shell 807, and the overcurrent protection circuit board 805 may be screwed on top of the inner bottom shell 806. The label 801 may be stacked on the upper surface of the top shell 802. The LED light 808 is mounted on the side of the mainboard, and the mainboard is further fixed on the side of the battery cell.

FIG. 9-A illustrates a perspective view of an exemplary connecting means according to some embodiments of the present disclosure. The connecting means 900 may include a negative input port 901, a positive input port 902, and a signal transmission port 903. The negative input port 901 and the positive input port 902 may receive the power from the booster and transmit the power to the two clamps. The signal transmission port 903 receive the signals from the signal acquisition unit and transmit the signals to the booster in a reverse direction.

In some embodiments, the connecting means 900 may have the same shape with the booster output port 708 and may be inserted into the booster output port when connecting to the booster 700, with the negative input port 901, the positive input port 902 and the signal transmission port 903 connected to the negative output port 710, the positive output port 711 and the signal reception port 709 respectively. In some embodiments, the negative input port 901, the positive input port 902, and the signal transmission port 903 may be through-holes. In some embodiments, some other signal transmission media may be provided therein to supply power and transmit target signals to the booster 700. For example, a data cable fixed therein may connect to the signal reception port 709 with a snap fit type structure. In some other embodiments, the connecting means may be omitted with a plurality of cables connected to the booster 700 directly.

FIG. 9-B illustrates an interior structure of an exemplary connecting means according to some embodiments of the present disclosure. Different from FIG. 9-A, connecting means 900 as is illustrated in FIG. 9-B include two cable output ports 904 and 905 on the opposite side. Within the connecting means 900, the negative input port 901 and the positive input port 902 may connect to the cable output port 904 and 905 respectively. The signal transmission port 903 may connect to at least one of the two cable output ports 904 and 905. In some embodiments, the connections described above may be implemented using cables, electrical circuits, or other transmission media.

The cable output ports 904 and 905 may further connect to the two clamps through a pair of cables, through at least one of which a signal related to the clamp states are transmitted. As is described in the preceding figure, for uniform polarity recognition, the black clamp 123-2 may connect to the negative pole of the vehicle battery 141, and the red clamp 123-1 may connect to the positive pole. In some embodiments, the cable output port 904 connects to the black clamp through the electrical cable, with the end of which being located on the upper halve of the black clamp. In some embodiments, the cable output port 905 connects to the red clamp through the other cable, which may be composed of two insulated cables being used for power supply and signal transmission separately, and the end of the power supply cable may be located on the upper halve of the red clamp and the end of the signal transmission cable may be located on the lower halve. In some other embodiments, the cable output port 904 and 905 may be through-holes. Cables of the negative input port 901, the positive input port 902 and the signal transmission port 903 may connect to the two clamps directly passing the through-holes.

Figure 10:
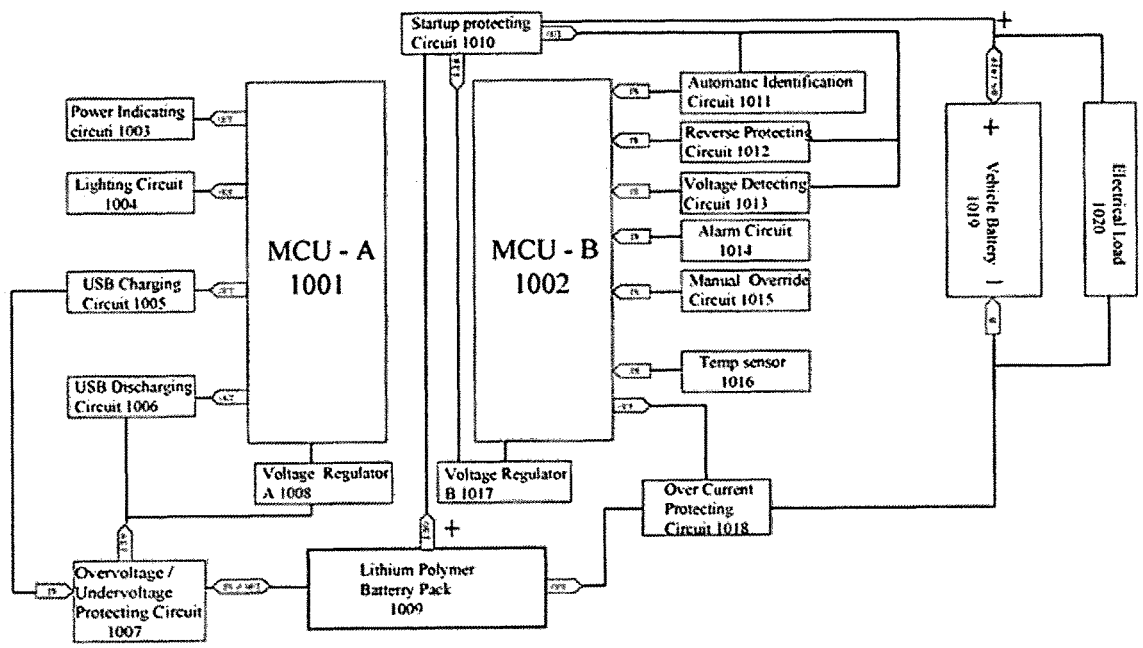
FIG. 10 is an exemplary functional block diagram of the booster for performing vehicle jump start according to some embodiments of the present disclosure.

FIG. 10 is an exemplary functional block diagram of the booster 110 for performing one or more functions described in the present disclosure (e.g., vehicle jump start). The booster may electrically connect to vehicle battery 1019 and electrical load 1020 through startup protecting circuit 1010. In some embodiments, the startup protecting circuit may be integrated on at least one of the automotive clamps, and may work upon receiving a signal related to the open state of the corresponding clamp. Components of the booster 110 may include microcontroller units MCU-A 1001 and MCU-B 1002, a lithium polymer battery pack 1009, a manual override circuit 1015 and a lighting circuit 1004, which relate to the operator console module, a power indicating circuit 1003 for displaying user notifying signals, and some auxiliary circuits. The booster 110 may further include a temp sensor 1016 and a voltage detecting circuit 1013 provided for detecting temperature and electrical signals respectively and as implementations of data acquisition module. The auxiliary circuits may include but not limited to an overvoltage/undervoltage protecting circuit 1007, an automatic identification circuit 1011, a reverse protecting circuit 1012, an over current protecting circuit 1018, voltage regulators 1007 and 1008, and an alarm circuit 1014.

MCU-A 1001 may be an implementation as a part of the microcontroller unit, which manages the lithium battery power storage and provides a stable power supply for peripherals and LED lights. As is illustrated, MCU-A 1001 may connect to and interact with a power indicating circuit 1003, a lighting circuit 1004, a USB charging circuit 1005, a USB discharging circuit 1006 and voltage regulator A 1008. In some embodiments, the MCU-A 1001 may monitor the received data or signals from the circuits mentioned above and generate an instruction based on a calculation, which may be conducted by the data processing unit 520, and output to certain target circuits for further processing or execution.

MCU-B 1002 may be an implementation of the other part the of the microcontroller unit, which monitors the booster 110 working status, and provides circuit protection and user notification for ensuring vehicle jump start safety. As is illustrated, MCU-B 1002 may connect to and interact to an automatic identification circuit 1011, a reverse protecting circuit 1012, a voltage detecting circuit 1013, an alarm circuit 1014, a manual override circuit 1015, a temp sensor 1016, voltage regulator B 1017, and an over-current protecting circuit 1018. In some embodiments, the MCU-B 1002 may monitor the received data or signals from the circuits mentioned above and generate an instruction based on a calculation, which may be conducted by the data processing unit 520 and output to certain target circuits for further processing or execution.

MCU-A and MCU-B may be general microcontrollers or special designed ICs and may be stand alone or integrated together. In some embodiments, MCU-A 1001 may be integrated on a mobile phone, and MCU-B 1002 may be integrated with the vehicle battery together with the connected circuits as described above, and the mobile phone battery may be used as lithium polymer battery pack 1009. Vehicle jump start may be activated by the mobile phone.

Lithium polymer battery pack 1009 may serve as a power source of the booster 110, and may electrically connect to a USB charging circuit 1005, a USB discharging circuit 1006 for power storage and supply. In some embodiments, the lithium polymer battery pack may be substituted by other power sources, for example, solar power, fuel cell, nuclear, wind energy, etc.

USB charging circuit 1005, may be an ordinary charging circuit in the art for charging a battery. In some embodiments, the USB charging circuit 1005 connects to a USB charging port implemented as 705 in FIG. 7-A, and receives 220V AC and convert it to a 12V DC and deliver the DC to the lithium polymer battery pack. In some other embodiments, charging circuit may be in a special design for better protection, easier use or fast charging, for example wireless charging. Another embodiment of the USB charging circuit is disclosed in detail in connection with FIG. 12. MCU-A 1001 may monitor the USB charging circuit 1005 at battery charging and produce a control signal for cutting off the outer power source when the battery is fully charged or in an abnormal state.

USB discharging circuit 1006 may be a discharging circuit for providing a power supply for peripherals, such as a mobile phone, tablet computer, game machine or the like. The USB discharging circuit 1006 may be monitored by MCU-A 1001 and may be turned off when the battery power level is below a predetermined value, for example, 20%. In some embodiments, the USB discharging circuit 1006 may electrically connect between the lithium polymer battery pack 1009 and a USB output port, which implemented as 706 referring to FIG. 7-A. Likewise, the discharging circuit may be a general circuit or a special designed circuit, for example, non-contact discharging circuit. An exemplary embodiment of the discharging circuit is disclosed in detail in FIG. 13. The discharging circuit 1006 may further connect to a voltage regulator 1008, which may be a simple "feedforward" design or may include negative feedback control loops to automatically maintain a constant voltage output, preferably a stable DC 5 volt output.

Figure 19:
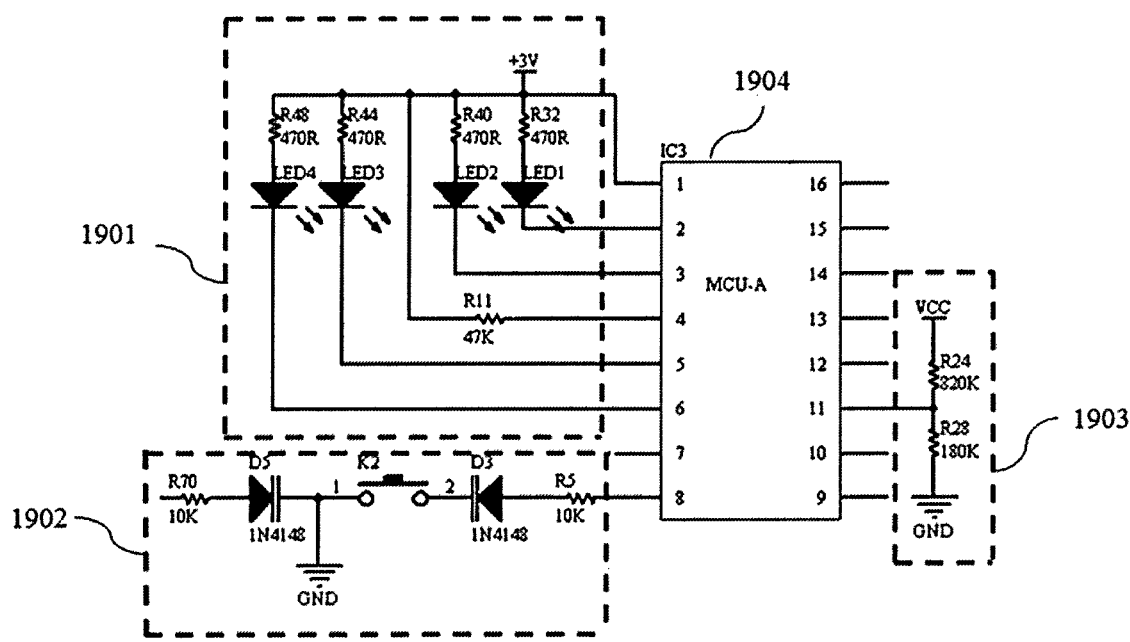
FIG. 19 is an exemplary schematic circuit diagram of the MCU-A according to some embodiments of the present disclosure.

Power indicating circuit 1003 may be configured to notify a power level of the lithium polymer battery pack 1009. In some embodiments, LED lights which implemented as 703 in FIG. 7-A being located on the exterior of the booster 110 may be used in the indicator for user notification. In some embodiments, the number of the LED lights turned on corresponds to the battery power level. In some embodiments, the LED lights may be substituted with a LED display. It is envisioned that alternative means of notifying a user of battery power level may be used, such as an audio signal. An example of the power indicating circuit is shown in FIG. 19, within which power indicating circuit 1901 shows battery power level measured by a power measurement circuit 1903.

Lighting circuit 1107 may be configured to provide a flashlight for illumination in a dark condition, as well as a SOS signals while in danger. In some embodiments, the lighting circuit may connect to an LED light implemented as 707 in FIG. 7-A. In some embodiments, the lighting circuit may be provided with a plurality of modes, including a constant flashlight mode, a flashing strobe light mode, and a SOS signal mode. A detailed embodiment of the lighting circuit is disclosed in FIG. 14.

Figure 15:
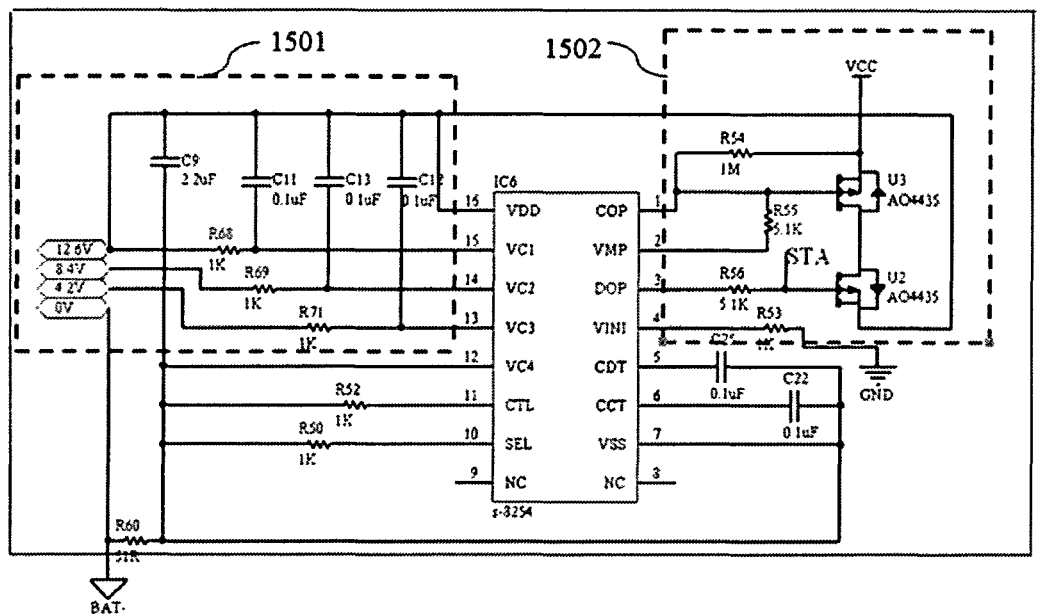
FIG. 15 is an exemplary schematic circuit diagram of the overvoltage/under voltage protecting circuit according to some embodiments of the present disclosure.

Overvoltage/under voltage protecting circuit 1007 may monitor the lithium polymer battery pack 1009 for maintaining an appropriate voltage level. The overvoltage/under voltage protecting circuit 1007 may communicate with MCU-A 1001 at any status when battery works, for example charging, discharging, or vehicle jump start As is illustrated in FIG. 15, an exemplary embodiment of the overvoltage/under voltage protecting circuit may include a high precision voltage detecting circuit 1501, a delay circuit, and an intelligent switch 1502. MCU-A may turn off the intelligent switch 1502 to avoid the damage to the battery cell when the detected voltage stays beyond normal voltage level.

Reverse protecting circuit 1012 may detect the polarity of a vehicle battery connects between the positive and negative clamps before providing a path for electric current flow. Generally, the clamps on one end of the pair of cables are different colors, such as red and black, for polarity recognition. Failure to recognize the correct polarity by connecting the colored clamps to the wrong poles is distinctly possible and can cause damage, such as an explosion. If there is an incorrect connection, the MCU-B may generate a reverse control signal to prohibit the incorrect connection. In some embodiments, the over-current protection circuit may be turned off, and the automatic identification circuit 1011 and manual override circuit 1015, may be prohibited in response to the received the reverse control signal. The LED light in the alarm circuit 1014 may notify the user to correct the reverse polarity and restart the vehicle jump start.

Figure 20:
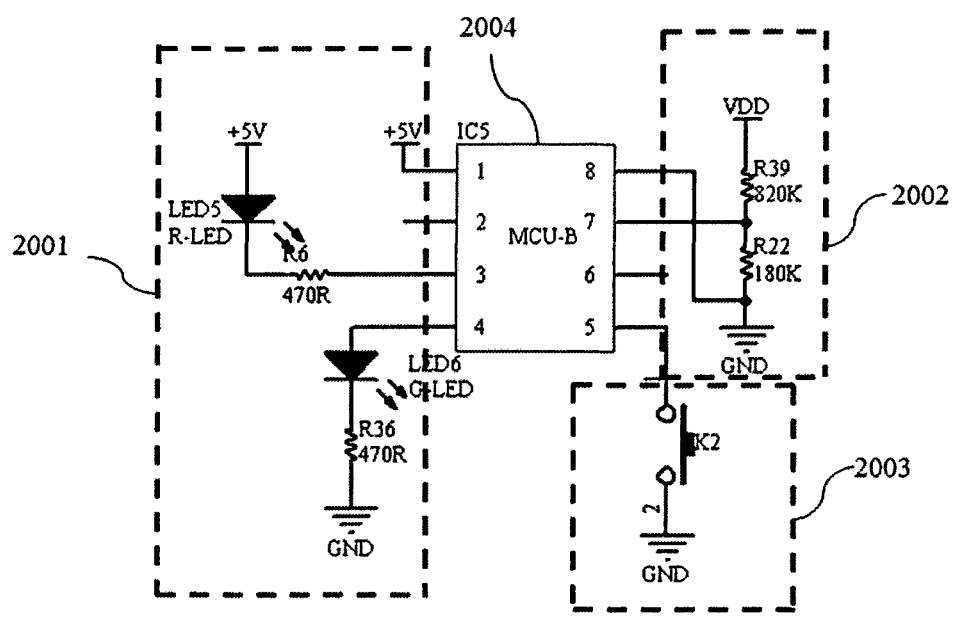
FIG. 20 is an exemplary schematic circuit diagram of the MCU-B according to some embodiments of the present disclosure.

Voltage detecting circuit 1013 may be configured to detect a signal indicative of the voltage level of the lithium polymer battery pack 1009 and send the detected signal to the MCU-B. The alarm circuit 1014 may provide the user with a notification when receiving a control signal generated by the MCU-B in response to the voltage level to. An exemplary embodiment describing the voltage detecting circuit and the alarm circuit is described in connection with FIG. 20. As illustrated in FIG. 20, different voltage level may trigger a different part of the alarm circuit. In some embodiments, when the voltage level of the lithium battery is below a predetermined lower limit of the safe startup voltage range, the alarm circuit 2001 may be triggered through port 3 of the MCU-B 2004 and the red LED light will be turned on. In some embodiments, a voltage value higher than upper limit of the safe startup voltage range may trigger the alarm circuit 2001 and switch the red light to a blink mode. In some other embodiments, when an appropriate voltage value within the safe startup voltage range, the green LED in the alarm circuit will be turned on through port 4. In some embodiments, the predetermined safe startup voltage range is 2V to 13V. Return back to FIG. 10, voltage detecting circuit 1013 may be integrated to the high precision voltage detecting circuit within the overvoltage/under voltage protecting circuit 1007.

Figure 16:
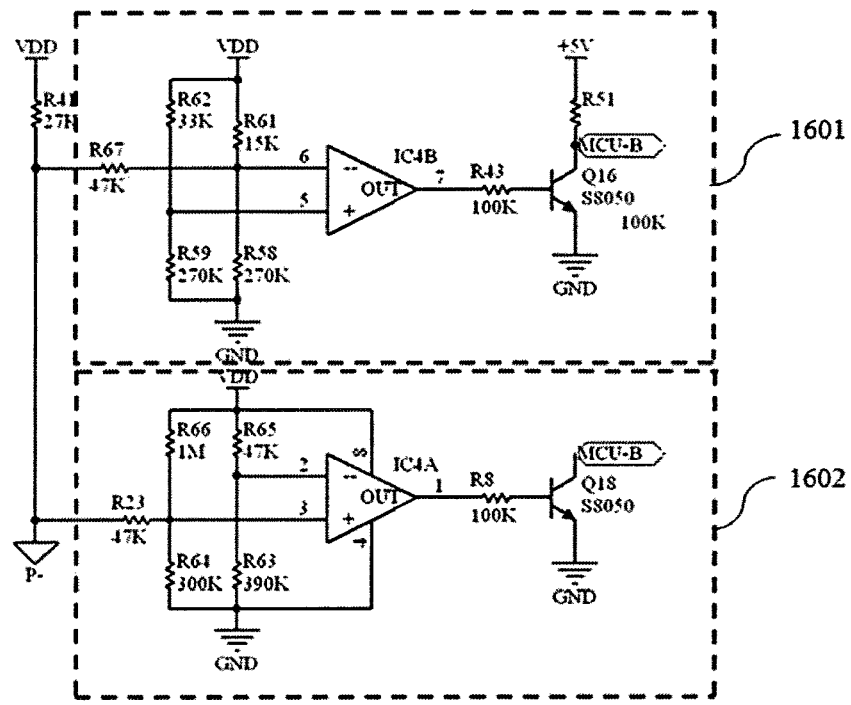
FIG. 16 is an exemplary schematic circuit diagram of the automatic connection circuit according to some embodiments of the present disclosure.

Automatic identification circuit 1011 may work in collaboration with the voltage detecting circuit 1013. When the detected vehicle battery voltage value is in a predetermined range, the automatic identification circuit 1011 may be activated automatically. In some embodiments, the vehicle battery voltage range that enables automatic identification is 2V to 13V. In some embodiments, an activation of automatic identification may be indicated by LED light in the alarm circuit 1014 with a strobe green flashlight. An exemplary embodiment is described in connection with FIG. 16, showing the automatic identification circuit 1601 and the reverse protecting circuit 1602 in detail.

Manual override circuit 1015 may be configured to jump start the vehicle in the absence of vehicle battery 1019. In some embodiments, the manual override circuit may be enabled by depressing manual override switch on the console, implemented as 702 in FIG. 7-A, on condition that the circuit is connected properly. The manual override circuit 2003 is described in detail as an exemplary example in FIG. 20.

Over current protecting circuit 1018, which electrically connects between the two batteries, may be configured as a master switch in the booster circuit for preventing high current flow. In some embodiments, the over current protecting circuit 1018 may be implemented as a field-effect tube, within which grids are controlled for cutting off the power supply apparatus. In some other embodiments, electric relays are used as another implementation. A more detailed description the over current protecting circuit, within which a field-effect tube in included, is provided in connection with FIG. 17.

Temp sensor 1016 may detect the temperature related to the over-current protecting circuit 1018 after the booster 110 be power on. An electrical signal based on the detected temperature may be generated and transmitted to MCU-B 1002, and further actions may be taken accordingly. In some embodiments, MCU-B 1002 may cut off the over current protecting circuit 1018 on receiving an abnormal voltage value. A detailed embodiment of the temp sensor is disclosed in FIG. 18. As is illustrated, a thermistor within the temp sensor, conducted through MOS tube 1801 may detect the surface temperature of the field-effect tube, and convert to a voltage before sending to MCU-B 1002.

After reading this description, it will become apparent to one skilled in the art how to implement the disclosure in various alternative embodiments and alternative applications. However, not all embodiments of the present disclosure are specifically described herein. It will be understood that the embodiments are presented by way of example only, and not limitation. As such, this detailed description of various alternative embodiments should not be construed to limit the scope or breadth of the present invention as described above.

Figure 11:
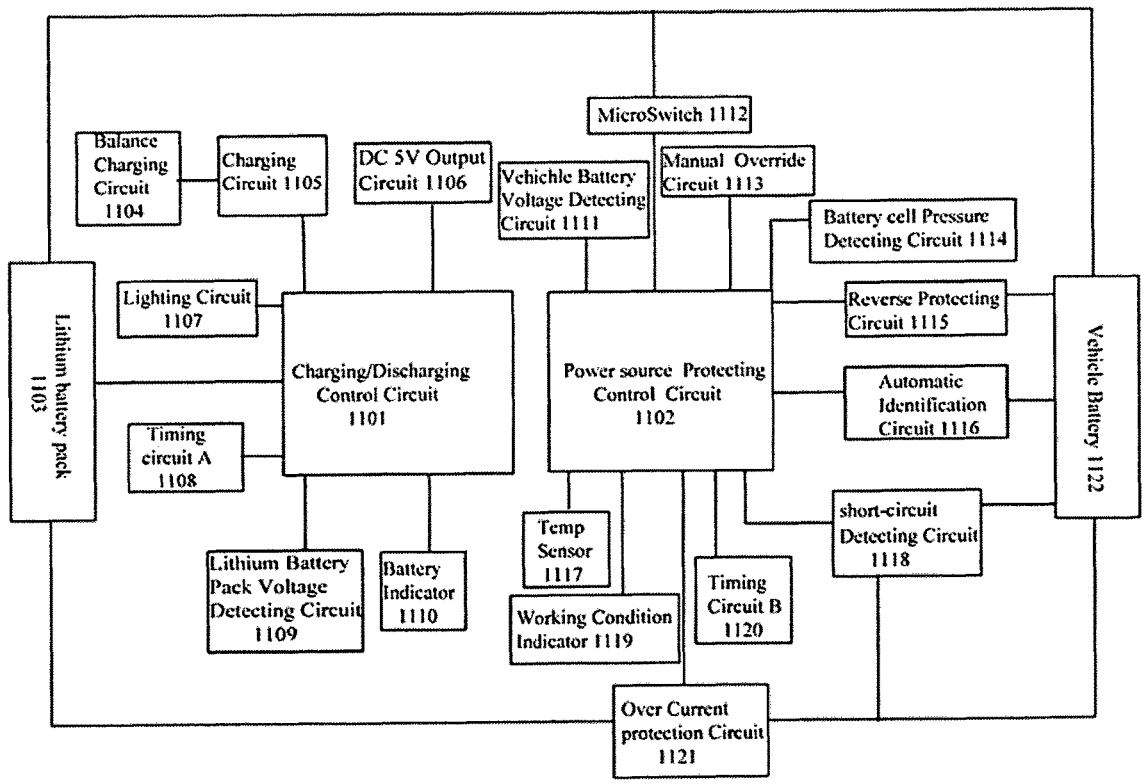
FIG. 11 illustrates a functional block diagram of another exemplary booster for performing vehicle jump start according to some embodiments of the present disclosure.

FIG. 11 illustrates a functional block diagram of another exemplary booster 110 for performing vehicle jump start according to some embodiments of the present disclosure. Similar to MCU-A in FIG. 10, the charging/discharging control circuit 1101, may connect to and interact with a charging circuit 1105, a lighting circuit 1107, a lithium battery pack voltage detecting circuit 1109, a low battery indicator 1110, a DC 5V output circuit 1106, and a lithium battery pack 1103, wherein the charging circuit 1105 may connect to a balance charging circuit 1104 at its input port. The charging/discharging control circuit 1101 may further connect to timing circuit A 1108.

Similar to MCA-B in FIG. 10, power source protection control circuit 1102 may connect to and interact with a vehicle battery voltage detecting circuit 1111, a manual override circuit 1113, a reverse protecting circuit 1115, an automatic identification circuit 1116, a working condition indicator 1119, a temp sensor 1117, and an over current protection circuit 1121. The power source protection control circuit 1102 may further connect to a microswitch 1112, a battery cell pressure detecting circuit 1114, and a timing circuit B 1120.

It should be noticed that similar elements as explained with reference to FIG. 10 will not be further disclosed, and other components not mentioned in FIG. 10, including timing circuit A 1108, timing circuit B 1120, a short-circuit detecting circuit 1118, a battery cell pressure detecting circuit 1114, and a microswitch 1112 will be described below.

Timing circuit A 1108 and timing circuit B 1120 may be general timers provided for the charging/discharging control circuit 1101 and the power source protecting control circuit 1102 respectively to measure time intervals or provide time delays. The timing circuit may be implemented by any timer IC, for example, 555 timer, 556 dual timer or 558 quad timer.

The short-circuit detecting circuit 1118 may be connected between the power source protecting control circuit 1102 and the vehicle battery 1122 for protecting the vehicle battery in the case of short circuit or over current. Upon receiving an abnormal current from short-circuit detecting circuit 1118, the power source protecting control circuit 1102 may generate a control signal for access into a safe mode. In some embodiments, in response to the control signal, over circuit protecting circuit 1121 may be cut off and working condition indicator 1119 may be triggered with red LED light blinking for notification. This safe mode may be terminated by restarting the booster 110.

Battery cell pressure detecting circuit 1114 may detect a volume change of the battery cell. The volume change may be transformed into a certain voltage and be send to the power source protecting control circuit 1102 for further processing. In some embodiments, pressure detecting circuit may connect to a 3D dimension measurement device, from which ultrasonic waves or laser can be generated, and battery cell volume based on measured target dimensions will be calculated. In some other embodiments, pressure detecting circuit may connect to an electric charge density measurement device, and battery cell volume change may be calculated based on the charge density change. If the battery volume changes beyond a predetermined level, the power source protecting circuit may turn off the booster and notify the user. In some embodiments, the microswitch may be turned off and working condition indicator may turn red light on accompanying with audio alarms.

The microswitch 1112 may be included in the circuit and monitor the whole circuit for any abnormal status mentioned above and may automatically be turned off in response to a circuit safety risk.

It should be noted that the component circuits of the booster in FIGS. 10 and 11 and the design of each component circuit are merely exemplary. Numerous other changes, substitutions, variations, alterations, and modifications may be ascertained to one skilled in the art and it is intended that the present disclosure encompass all such changes, substitutions, variations, alterations, and modifications as falling within the scope.

Figure 12:
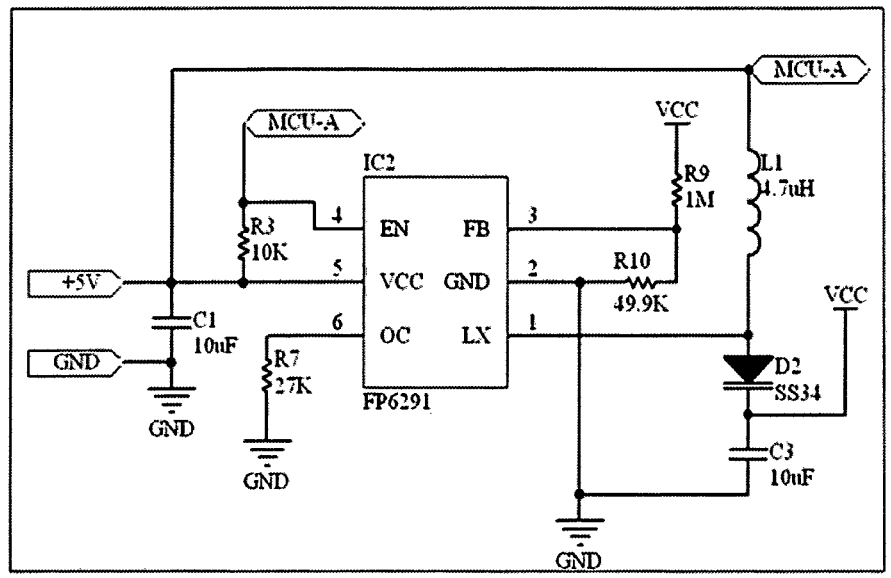
FIG. 12 is an exemplary schematic circuit diagram of the charging circuit according to some embodiments of the present disclosure.

FIG. 12 is an exemplary schematic circuit diagram of the charging circuit according to some embodiments of the present disclosure. As illustrated in FIG. 12, the charging circuit may be an integrated circuit, which may be implemented by a microprocessor FP6291 and some related circuits connecting to its six ports. In some embodiments, MCU-A may monitor the USB charging circuit at battery charging and generate an instruction to cut off the outer power source when the battery is fully charged or in an abnormal state.

Figure 13:
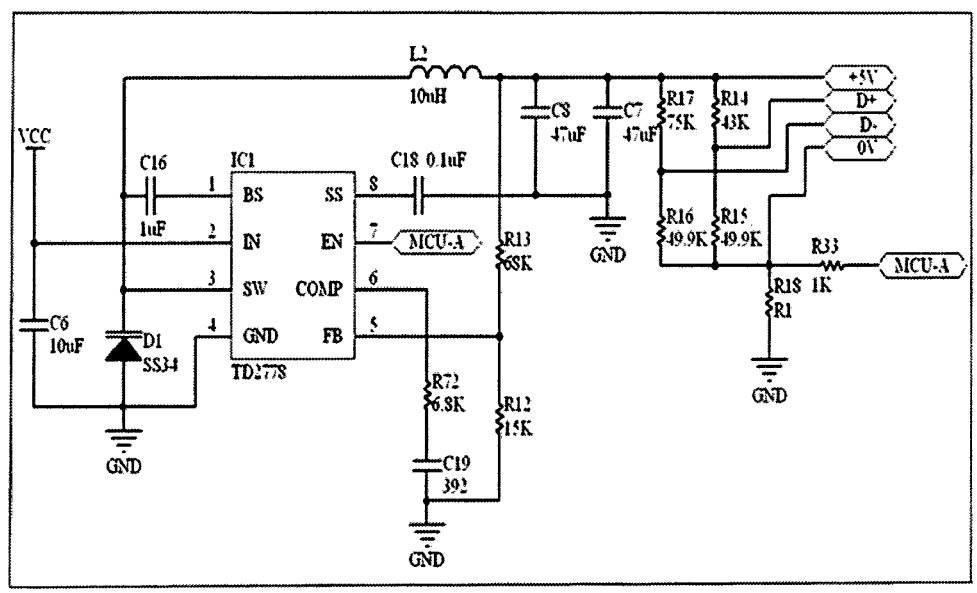
FIG. 13 is an exemplary schematic circuit diagram of the discharging circuit according to some embodiments of the present disclosure.

FIG. 13 is an exemplary schematic circuit diagram of the discharging circuit according to some embodiments of the present disclosure. As illustrated in FIG. 13, the discharging circuit may be an integrated circuit, which may be implemented by a microprocessor TD2778 and some related circuits connecting to the its eight ports. In some embodiments, MCU-A monitors the USB discharging circuit while charging a peripheral, and switch off the discharging circuit when the battery power level is below a predetermined value, for example, 20%.

Figure 14:
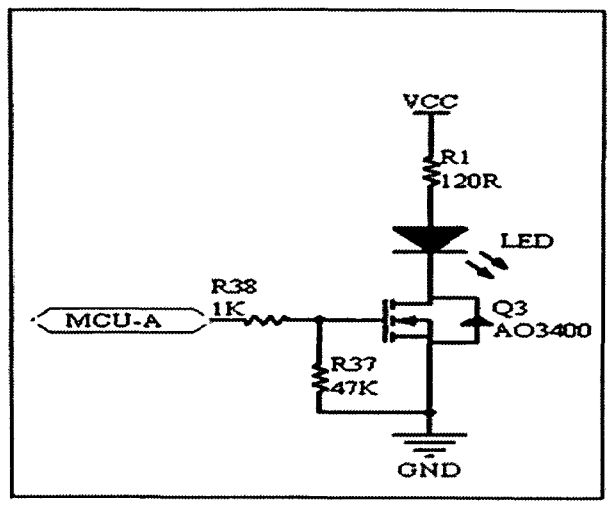
FIG. 14 is an exemplary schematic circuit diagram t of the lighting circuit according to some embodiments of the present disclosure.

FIG. 14 is an exemplary schematic circuit diagram t of the lighting circuit according to some embodiments of the present disclosure. As illustrated in FIG. 14, the lighting circuit may be an integrated circuit, within which a LED light is provided. In some embodiments, the lighting circuit may be provided with a plurality of modes, including a constant flashlight mode, a flashing strobe light mode, and a SOS signal mode.

FIG. 15 is an exemplary schematic circuit diagram of the overvoltage/under voltage protecting circuit according to some embodiments of the present disclosure. As illustrated in FIG. 15, the overvoltage/under voltage protecting circuit may be an integrated circuit, which may include a voltage detecting circuit and a delay circuit. In some embodiments, the IC may be powered by a plurality of batteries connected in series 1501. In some embodiments, the batteries may include 3 or 4 batteries. In some embodiments, the IC may control the charging/discharging switch 1502, basing on the voltage of the power 210.

FIG. 16 is an exemplary schematic circuit diagram of the automatic connection circuit according to some embodiments of the present disclosure. As illustrated in FIG. 16, the automatic connection circuit may be an integrated circuit, which may include an automatic identification circuit 1601 and a reverse protecting circuit 1602. The automatic connection circuit may be enabled when there is no error signal generated from both the automatic identification circuit 1601 and the reverse protecting circuit 1602. In some embodiments, when the detected vehicle battery voltage value is in a predetermined range, and polarity between two batteries connected properly, the automatic connection may be enabled.

Figure 17:
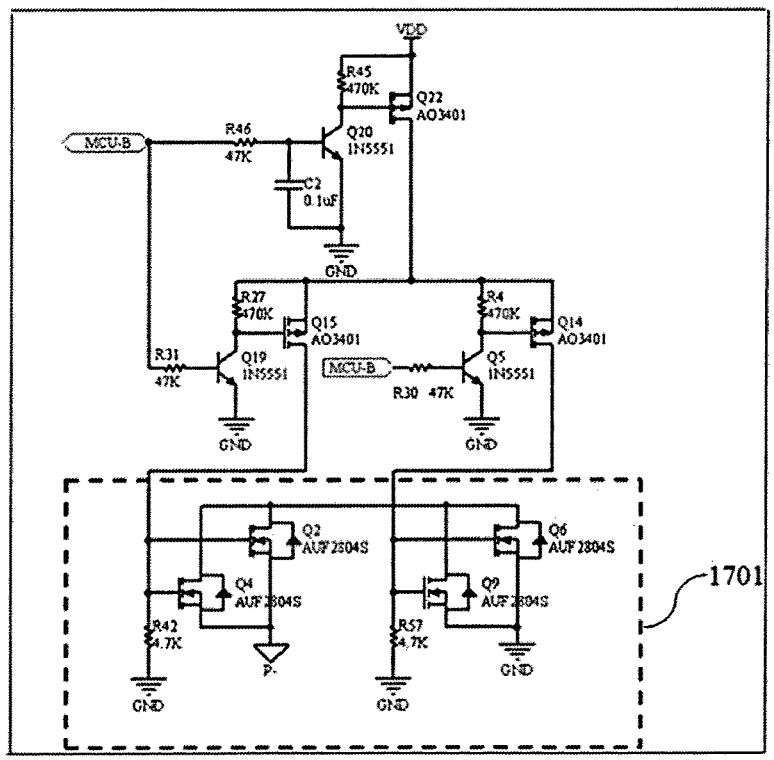
FIG. 17 is an exemplary schematic circuit diagram of the reverse protecting circuit according to some embodiments of the present disclosure.

FIG. 17 is an exemplary schematic circuit diagram of the reverse protecting circuit according to some embodiments of the present disclosure. As illustrated in FIG. 17, the reverse protecting circuit 1701 may be an integrated circuit which connects to MCU-B. If there is an incorrect polarity, the MCU-B may generate a reverse control signal. In some embodiments, the over current protection circuit may be turned off, and the automatic identification circuit and manual override circuit may be prohibited in response to the received the reverse control signal.

Figure 18:
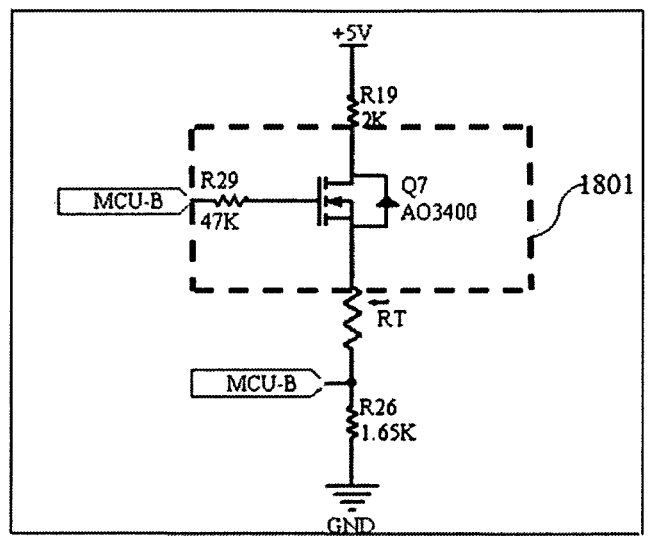
FIG. 18 is an exemplary schematic circuit diagram of the over current protecting circuit according to some embodiments of the present disclosure.

FIG. 18 is an exemplary schematic circuit diagram of the over current protecting circuit according to some embodiments of the present disclosure. As illustrated in FIG. 18, the over current protecting circuit may be implemented as a field-effect tube, within which grids are controlled for cutting off the power supply apparatus.

FIG. 19 is an exemplary schematic circuit diagram of the MCU-A according to some embodiments of the present disclosure. As is illustrated in FIG. 19, the MCU-A 1904 may be a microcontroller, and may interact with the power indicating circuit 1901, the automatic identification circuit 1902 and the power measurement circuit 1903 and some other circuits not shown in the figure. In some embodiments, the MCU-A 1904 may monitor the received data or signals from the connected circuits and generate an instruction based on a calculation, which may be conducted by the data processing unit 520, and output to certain target circuits for further processing or execution.

FIG. 20 is an exemplary schematic circuit diagram of the MCU-B according to some embodiments of the present disclosure. As is illustrated in FIG. 20, the MCU-B 2004 may be a microcontroller, and may interact with the alarm circuit 2001, the voltage detecting circuit 2002 and the manual override circuit 2003 and some other circuits not shown in the figure. In some embodiments, the MCU-B 2004 may monitor the received data or signals from the connected circuits and generate an instruction based on a calculation, which may be conducted by the data processing unit 520, and output to certain target circuits for further processing or execution.

Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each

The invention claimed is:

1. A system, comprising:
   a vehicle battery;
   a booster configured to provide a power supply of the vehicle battery; and
   a jumper cable device configured to connect the booster to the vehicle battery, wherein
     the jumper cable device includes a clamp, a detecting unit connected to the clamp, and a plurality of ports, the power supply is provided to the vehicle battery via two of the plurality of ports, a remaining port of the plurality of ports is connected to both a port of the booster and the clamp, receives a signal from the detecting unit and transmits the signal to the booster, and the signal indicates an open/closed state of the clamp; and
     the booster includes a microcontroller unit (MCU) configured to cut off the electrical connection of the clamp with the power supply of the booster based on the detected signal indicative of the closed state of the clamp.

2. The system of claim 1, wherein the clamp comprises two clamp halves.

3. The system of claim 2, wherein the two clamp halves are in contact when the clamp is in a closed state.

4. The system of claim 2, wherein the two clamp halves are not in contact with each other when the clamp is in an open state.

5. The system of claim 2, wherein the detecting unit is a sensor.

6. The system of claim 5, wherein the sensor is an electrical sensor configured to determine the open/closed state of the clamp.

7. The system of claim 1, wherein: the detecting unit includes
   an electrical cable connected to a first halve of the clamp, and
   a second halve of the clamp is connected to a negative cable or a positive cable.

8. The system of claim 1, wherein the MCU is further configured to generate, based on the detected signal, an instruction relating to an operation of a power supply of the booster or a circuit in the booster.

9. The system of claim 8, wherein the instruction is configured to cut off the power supply of the booster.

10. The system of claim 8, wherein the circuit in the booster is an auxiliary circuit.

11. The system of claim 10, wherein the instruction is configured to cut off the auxiliary circuit.

12. The system of claim 1, further comprising a low voltage protecting circuit configured to cut off a power supply of the booster when the voltage of the power supply of the booster equals to or greater than a threshold value.

13. The system of claim 12, wherein the threshold value ranges between 5.8 volts to 6.2 volts.

14. The system of claim 1, further comprising an automatic connecting circuit configured to connect the vehicle battery to the booster automatically, when no fault situation is detected.

15. The system of claim 1, further comprising a temperature protecting circuit configured to interrupt the charging or discharging of the power supply of the booster, when the temperature of the power supply of the booster either equals to or greater than a first temperature threshold value, or equals to or less than a second temperature threshold value.

16. The system of claim 15, wherein the first temperature threshold value is 60 degrees centigrade.

17. The system of claim of 15, wherein the second temperature threshold value is minus 5 degrees centigrade.

18. A method for protecting a boosting system, the boosting system comprising:
   a vehicle battery;
   a booster configured to provide a power supply of the vehicle battery; and
   a jumper cable device configured to connect the booster to the vehicle battery, the jumper cable device comprising a clamp, a detecting unit connected to the clamp, and a plurality of ports, and a power supply being provided to the vehicle battery via two of the plurality of ports,
   the method comprising:
     detecting, at the detecting unit of the jumper cable device, a signal indicative of an open/closed state of the clamp of the jumper cable device;
     transmitting the signal to the booster via a remaining port of the plurality of ports of the jumper cable device, wherein the remaining port of the jumper cable device is connected to both a port of the booster and the clamp and receives the signal from the detecting unit; and
     generating, at a microcontroller unit (MCU) of the booster, an instruction to cut off an electrical connection of the clamp with a power supply of the booster based on the detected signal indicative of the closed state of the clamp.

19. The method of claim 18, wherein the instruction is configured to cut off a power supply of the booster when the clamp is in a closed state.

20. The system of claim 1, wherein the system further includes a wireless communication assembly.

* * * * *